(12) United States Patent
Nagata et al.

(10) Patent No.: US 7,813,317 B2
(45) Date of Patent: Oct. 12, 2010

(54) WIRELESS PACKET COMMUNICATION METHOD AND WIRELESS PACKET COMMUNICATION APPARATUS

(75) Inventors: Kengo Nagata, Kanagawa (JP); Tomoaki Kumagai, Kanagawa (JP); Shinya Otsuki, Kanagawa (JP); Kazuyoshi Saito, Tokyo (JP); Satoru Aikawa, Kanagawa (JP); Atsushi Ohta, Kanagawa (JP); Akinori Hirukawa, Kanagawa (JP); Yasuhiko Inoue, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1463 days.

(21) Appl. No.: 10/542,220

(22) PCT Filed: Jun. 18, 2004

(86) PCT No.: PCT/JP2004/008910

§ 371 (c)(1),
(2), (4) Date: Jul. 14, 2005

(87) PCT Pub. No.: WO2004/114561

PCT Pub. Date: Dec. 29, 2004

(65) Prior Publication Data
US 2006/0209874 A1 Sep. 21, 2006

(30) Foreign Application Priority Data
Jun. 18, 2003 (JP) ............... 2003-173914
Jun. 18, 2003 (JP) ............... 2003-173922
Jun. 18, 2003 (JP) ............... 2003-173949
Jul. 18, 2003 (JP) ............... 2003-199229

(51) Int. Cl.
*H04W 4/00* (2009.01)

(52) U.S. Cl. .................................... 370/329
(58) Field of Classification Search ............... 370/329; 455/450
See application file for complete search history.

(56) References Cited

U.S. PATENT DOCUMENTS 5,917,822 A * 6/1999 Lyles et al. ............... 370/395.4

(Continued)

FOREIGN PATENT DOCUMENTS

JP 05-035624 A 2/1993

(Continued)

OTHER PUBLICATIONS

Satoshi Kurosaki, Yusuke Asai, Takatoshi Sugiyama, Masahiro Umehira, "MIMO Channel ni yori 100Mbit/s o Jitsugen suru Kotaiiki Ido Tsushin'yo SMD-COFDM Hoshiki no. Teian", The Institute of Electronics, Information and Communication Engineers Gijutsu Kenkyu Hokoku, vol. 101, No. 370, Oct. 12, 2001, pp. 37 to 42 (with English Translation).

(Continued)

*Primary Examiner*—Hanh Nguyen
*Assistant Examiner*—Juvena Loo
(74) *Attorney, Agent, or Firm*—Harness, Dickey & Pierce, P.L.C.

(57) ABSTRACT

Data packets are transmitted between two STAs capable of using plural radio channels and MIMO together, by using idle channels and MIMO. When at least one idle channel has been detected, plural data packets are generated in the same number as the sum of MIMO numbers of the respective idle channels, in which the data packets are generated from one or plural data frames, and plural data packets having the same packet time length are transmitted simultaneously between the two STAs by using the idle channels and MIMO.

16 Claims, 21 Drawing Sheets

U.S. PATENT DOCUMENTS

| | | | |
|---|---|---|---|
| 6,519,259 B1 * | 2/2003 | Baker et al. | 370/395.4 |
| 6,563,829 B1 * | 5/2003 | Lyles et al. | 370/395.21 |
| 6,731,618 B1 * | 5/2004 | Chung et al. | 370/328 |
| 6,842,442 B2 * | 1/2005 | Okawa et al. | 370/335 |
| 6,901,065 B1 * | 5/2005 | Ehrstedt et al. | 370/341 |
| 7,002,949 B2 * | 2/2006 | Garcia-Luna-Aceves et al. | 370/351 |
| 7,020,482 B2 * | 3/2006 | Medvedev et al. | 455/522 |
| 7,058,367 B1 * | 6/2006 | Luo et al. | 455/101 |
| 7,167,690 B2 * | 1/2007 | Baker et al. | 455/101 |
| 2002/0036987 A1 * | 3/2002 | Garcia-Luna-Aceves et al. | 370/238 |
| 2002/0039884 A1 * | 4/2002 | Raynes et al. | 455/13.3 |
| 2002/0061001 A1 * | 5/2002 | Garcia-Luna-Aceves et al. | 370/338 |
| 2002/0067309 A1 * | 6/2002 | Baker et al. | 342/367 |
| 2002/0102987 A1 * | 8/2002 | Souisse et al. | 455/454 |
| 2002/0105925 A1 * | 8/2002 | Shoemake | 370/330 |
| 2002/0159431 A1 * | 10/2002 | Moulsley et al. | 370/347 |
| 2002/0181492 A1 * | 12/2002 | Kasami et al. | 370/445 |
| 2002/0181509 A1 * | 12/2002 | Mody et al. | 370/480 |
| 2003/0003880 A1 * | 1/2003 | Ling et al. | 455/92 |
| 2003/0022629 A1 * | 1/2003 | Miyoshi et al. | 455/67.3 |
| 2003/0035491 A1 * | 2/2003 | Walton et al. | 375/267 |
| 2003/0086437 A1 * | 5/2003 | Benveniste | 370/461 |
| 2003/0108117 A1 * | 6/2003 | Ketchum et al. | 375/295 |
| 2003/0124976 A1 * | 7/2003 | Tamaki et al. | 455/15 |
| 2003/0125040 A1 * | 7/2003 | Walton et al. | 455/454 |
| 2003/0139196 A1 * | 7/2003 | Medvedev et al. | 455/522 |
| 2003/0186698 A1 * | 10/2003 | Holma et al. | 455/436 |
| 2004/0001429 A1 * | 1/2004 | Ma et al. | 370/210 |
| 2004/0002364 A1 * | 1/2004 | Trikkonen et al. | 455/562.1 |
| 2004/0114506 A1 * | 6/2004 | Chang et al. | 370/208 |
| 2004/0213184 A1 * | 10/2004 | Hu et al. | 370/335 |
| 2006/0171353 A1 * | 8/2006 | Nagata et al. | 370/329 |
| 2006/0189280 A1 * | 8/2006 | Goldberg | 455/101 |
| 2006/0209874 A1 * | 9/2006 | Nagata | 370/445 |

FOREIGN PATENT DOCUMENTS

| | | |
|---|---|---|
| JP | 08-204630 | 9/1996 |
| JP | 09-055776 A | 2/1997 |
| JP | 11-154989 A | 6/1999 |
| JP | 2002-064459 A | 2/2002 |
| JP | 2003-101604 A | 4/2003 |

OTHER PUBLICATIONS

Satoshi Kurosaki, Yusuke Asai, Takatoshi Sugiyama, Masahiru Umehira, "A SDM-COFDM Scheme Employing a Simple Feed-Forward Inter-Channel Interference Canceller for MIMO Based Broadband Wireless LANs", IEICE Transactions on Communications, vol. E86-B, No. 1, Jan. 1, 2003, pp. 283 to 290.

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

IEEE Std 802.11-1997, Information technology—Telecommunications and information exchange between systems—Local and metropolitan.area networks—specific requirements—Part 11: Wireless LAN Medium Access Control (MAC) and Physical Layer (PHY) specifications.

Low-powered Data Communication System/Broadband Mobile Access Communication System (CSMA) standard, ARIB STD-T71 version 1.0, Association of Radio Industries and Businesses (with English Translation).

Iizuka et al., "5 GHz Wireless LAN System Based on the IEEE 802.11a standard—Packet Transmission Characteristics—", B-5-124, Proceedings of the Electronics Information and Communication Engineers, Society Conference 2000 (with English Translation).

* cited by examiner

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application Nos. 2003-173949, 2003-173922 and 2003-173914, all filed on Jun. 18, 2003, and No. 2003-199229, filed on Jul. 18, 2003, the entire contents of which are incorporated herein by reference.

TECHNICAL FIELD

The present invention relates to a wireless packet communication method and a wireless packet communication apparatus for transmitting plural data packets simultaneously between two stations (hereinafter STA) using plural radio channels and/or Multiple Input Multiple Output (hereinafter MIMO).

BACKGROUND ART

In conventional wireless packet communication apparatus, only one radio channel to be used is determined in advance, whether this radio channel is idle or not is detected (carrier sense) before transmission of a data packet, and one data packet is transmitted only if the radio channel is idle. This kind of control allows plural STAs to share a single radio channel by using it during periods that are deviated from each other ((1) International Standard ISO/IEC 8802-11 ANSI/EEE Std. 802.11, 1999 edition, Information technology—Telecommunications and information exchange between systems—local and metropolitan area networks—Specific requirements—part 11: Wireless LAN Medium Access Control (MAC) and Physical Layer (PHY) specifications; (2) Low-powered Data Communication System/Broadband Mobile Access Communication System (CSMA) standard, ARIB STD-T71 version 1.0, Association of Radio Industries and Businesses, settled in 2000).

In such wireless packet communication apparatus, one method for increasing the maximum throughput is to increase the data transmission rate of a PHY layer by widening the frequency band per radio channel.

However, as pointed out in a document (Iizuka et al., "5 GHz Wireless LAN System based on the IEEE802.11a standard—Packet Transmission Characteristics—", B-5-124, Proceedings of The Institute of Electronics, Information and Communication Engineers Society Conference 2000, September 2000), to avoid packet collision, it is necessary to set, immediately after transmission of a packet, a prescribed transmission deferral duration that is independent of the data transmission rate of a PHY layer. Where such a transmission deferral duration is set, the data packet transmission efficiency (i.e., the ratio of the maximum throughput to the data transmission rate of a PHY layer) decreases as the data transmission rate of a PHY layer increases. Therefore, it is difficult to increase the throughput greatly merely by increasing the data transmission rate of a PHY layer.

In contrast, application of a MIMO technique (Kurosaki et al., "100 Mbit/s SDM-COFDM over MIMO Channel for Broadband Mobile Communications," Technical Reports of The Institute of Electronics, Information and Communication Engineers, A•P2001-96, RCS2001-135 (2001-10)) is being considered as a method for increasing the maximum throughput without increasing the frequency band per radio channel. This MIMO technique is such that different data packets are sent simultaneously from plural antennas on the same radio channel and the plural data packets transmitted simultaneously on the same radio channel are received by performing pieces of digital signal processing corresponding to respective propagation coefficient differences of data packets received by plural antennas of a cooperating STA. The MIMO number is determined in accordance with the propagation coefficient etc.

On the other hand, where each STA has plural wireless network interfaces and hence can use plural radio channels, it is expected that the throughput can be made higher than in the case of a communication method in which a single radio channel is time-divided, by causing plural STAs to use different radio channels.

However, where the center frequencies of the plural radio channels used simultaneously are close to each other, the influence of leakage power that leaks from the frequency range of one radio channel to that of another radio channel is large. In general, in transmitting a data packet, after a transmit-side station has sent a data packet a receive-side station returns, to the transmit-side station, a delivery acknowledgment packet (ACK packet, NACK packet) for a data packet received by the receive-side station. When the transmit-side station attempts to receive this delivery acknowledgment packet, leakage power from another radio channel that is being used simultaneously for transmission is problematic.

For example, assume a case that as shown in FIG. 21 the center frequencies of radio channels #1 and #2 are close to each other and different times are required for transmission of data packets that are transmitted simultaneously on those radio channels. In this example, the data packet that is transmitted on radio channel #1 is short. Therefore, radio channel #2 is still used for transmission when an ACK packet is received. As a result, the ACK packet may not be received on radio channel #1 due to leakage power from radio channel #2. In this type of situation, increase in throughput is not expected even if transmissions are performed simultaneously by using plural radio channels.

This kind of case occurs due to a difference between in packet time length ((time required for transmission)=(data size)) between data packets in the case where the transmission rates of respective radio channels are the same, and due to a difference in packet time length ((time required for transmission)=(data size)/(transmission rate)) between data packets in the case where the transmission rates of respective radio channels are taken into consideration.

Incidentally, in wireless LAN systems etc., the data sizes of data frames that are input from a network are not constant. Therefore, when input data frames are converted to data packets and transmitted sequentially, the packet time lengths (times required for transmission) of respective data packets vary. Therefore, as shown in FIG. 21, even if plural data packets are transmitted simultaneously, the packet time lengths of the respective data packets are different from each other and it is highly probable that the reception of an ACK packet fails.

An object of the present invention is to provide a wireless packet communication method and a wireless packet communication apparatus capable of transmitting plural data packets simultaneously between two STAs and increasing the throughput even if power leakage occurs between radio channels, in the case where each STA can use plural radio channels simultaneously.

DISCLOSURE OF THE INVENTION

A first aspect of the invention provides a wireless packet communication method for transmitting a data packet between two STAs capable of using plural radio channels, by using a radio channel that is judged idle by carrier sensing, wherein when it is detected by the carrier sensing that plural radio channels are idle at the same time, plural data packets are transmitted simultaneously between the two STAs by using plural idle radio channels.

A second aspect of the invention provides a wireless packet communication method for transmitting a data packet between two STAs capable of using plural radio channels, by using a radio channel that is judged idle by carrier sensing, wherein when it is detected by the carrier sensing that plural radio channels are idle at the same time, plural data packets having the same packet time length are generated and plural data packets having the same packet time length are transmitted simultaneously between the two STAs by using plural idle radio channels.

A third aspect of the invention provides a wireless packet communication method for transmitting a data packet between two STAs capable of using plural radio channels and setting transmission rates for respective radio channels, by using a radio channel that is judged idle by carrier sensing, wherein when it is detected by the carrier sensing that plural radio channels are idle at the same time, plural data packets having the same packet time length are generated in accordance with transmission rates of plural idle radio channels and plural data packets having the same packet time length are transmitted simultaneously between the two STAs by using plural idle radio channels.

A fourth aspect of the invention provides a wireless packet communication method for transmitting a data packet between two STAs capable of using plural radio channels and setting transmission rates for respective radio channels, by using a radio channel that is judged idle by carrier sensing, wherein when it is detected by the carrier sensing that plural radio channels are idle at the same time, transmission rates of plural idle radio channels are set to the same transmission rate, plural data packets having the same packet time length are generated, and plural data packets having the same packet time length are transmitted simultaneously between the two STAs by using plural idle radio channels.

According to a fifth aspect of the invention, in the fourth aspect of the invention, the transmission rates of the plural idle radio channels are set equal to a lowest one of the transmission rates.

A sixth aspect of the invention provides a wireless packet communication method for transmitting a data packet between two STAs capable of using MIMO, by using a radio channel that is judged idle by carrier sensing, wherein when it is detected by the carrier sensing that at least one radio channel is idle, plural data packets having the same packet time length are generated and plural data packets having the same packet time length are transmitted simultaneously between the two STAs by using one idle radio channel and the MIMO.

According to a seventh aspect of the invention, in any one of the first to fifth aspects of the invention, plural data packets having the same packet time length are transmitted simultaneously in a number that is equal to the sum of MIMO numbers of plural, respective radio channels between the two STAs capable of using plural radio channels and MIMO together by using plural idle radio channels and the MIMO.

According to an eighth aspect of the invention, in any one of the first to seventh aspects of the invention, while the STA itself is performing a transmission on at least one radio channel, the STA selects, from idle radio channels, a radio channel or channels that do not receive influence of leakage power from the radio channel being used for the transmission.

According to a ninth aspect of the invention, in any one of the first to seventh aspects of the invention, while the STA itself is performing a transmission on at least one radio channel, the STA prohibits transmission process including carrier sensing until completion of the transmission.

According to the tenth aspect of the invention, in any one of the first to fifth aspects of the invention, the STA transmits, simultaneously, data packets generated from all transmission-standby data frames if the number of transmission-standby data frames is smaller than or equal to the number of idle channels, and generates and transmits, simultaneously, data packets whose number is equal to the number of idle channels if the number of transmission-standby data frames exceeds the number of idle channels.

According to the eleventh aspect of the invention, in any one of the first to fifth aspects of the invention, if the number K of transmission-standby data frames exceeds the number N of idle channels, the STA waits until a relationship $N \geq K$ is satisfied, all radio channels become idle before the relationship $N \geq K$ is satisfied, a prescribed time elapses before the relationship $N \geq K$ is satisfied, or the number or a data size of transmission-standby data frames reaches a prescribed value before the relationship $N \geq K$ is satisfied, and then generates data packets in a number that is suitable for the number of current idle channels and transmits the generated data packets simultaneously.

According to the twelfth aspect of the invention, in any one of the first to fifth aspects of the invention, if the number K of transmission-standby data frames is smaller than the number N of idle channels, the STA waits until a relationship $N=K$ is satisfied, a prescribed time elapses before the relationship $N=K$ is satisfied, or the number or a data size of transmission-standby data frames reaches a prescribed value before the relationship $N=K$ is satisfied, and then generates and transmits, simultaneously, plural data packets.

According to a thirteenth aspect of the invention, in the sixth aspect of the invention, the STA transmits, simultaneously, data packets generated from all transmission-standby data frames if the number of transmission-standby data frames is smaller than or equal to a MIMO number, and generates data packets whose number is equal to the MIMO number and transmits the generated data packets simultaneously if the number of transmission-standby data frames exceeds the MIMO number.

According to a fourteenth aspect of the invention, in the seventh aspect of the invention, the STA transmits, simultaneously, data packets generated from all transmission-standby data frames if the number of transmission-standby data frames is smaller than or equal to the number of simultaneous transmissions that is the sum of the MIMO numbers of the plural, respective radio channels, and generates data packets whose number is equal to the number of simultaneous transmissions and transmits the generated data packets simultaneously if the number of transmission-standby data frames exceeds the number of simultaneous transmissions.

According to the fifteenth aspect of the invention, in the seventh aspect of the invention, if the number K of transmission-standby data frames exceeds the number of simultaneous transmissions T that is the sum of the MIMO numbers of the plural, respective radio channels, the STA waits until a relationship $T \geqq K$ is satisfied, all radio channels become idle before the relationship $T \geqq K$ is satisfied, a prescribed time elapses before the relationship T K is satisfied, or the number or a data size of transmission-standby data frames reaches a prescribed value before the relationship $T \geqq K$ is satisfied, and then generates data packets in a number that is suitable for the current number of simultaneous transmissions and transmits the generated data packets simultaneously.

According to the sixteenth aspect of the invention, in the seventh aspect of the invention, if the number K of transmission-standby data frames is smaller than the number of simultaneous transmissions T that is the sum of the MIMO numbers of the plural, respective radio channels, the STA waits until a relationship T=K is satisfied, a prescribed time elapses before the relationship T=K is satisfied, or the number or a data size of transmission-standby data frames reaches a prescribed value before the relationship T=K is satisfied, and then generates and transmits, simultaneously, plural data packets.

According to the seventeenth aspect of the invention, in the seventh aspect of the invention, the STA selects, on the basis of at least one of the number of idle channels, a MIMO number of each radio channel, and the number of transmission-standby data frames, one of a first mode in which a single radio channel is used and MIMO is not used, a second mode in which a single radio channel and MIMO are used, a third mode in which plural radio channels are used and MIMO is not used, and a fourth mode in which plural radio channels and MIMO are used.

An eighteenth aspect of the invention provides a wireless packet communication apparatus for transmitting a data packet between two STAs capable of using plural radio channels, by using a radio channel that is judged idle by carrier sensing, comprising transmission buffer block, channels' occupation status analyzing block, data packet generating block, packet switching block, and data frame management block.

The transmission buffer block temporarily holds data frames to be transmitted, holds information regarding stored data packets that correlates address information of data frames in its possession with packet sizes, and reads out and outputs a requested data packet when receiving a packet sending request. The channels' occupation status analyzing block acquires pieces of idle/busy state judgment information of a predetermined plural number of, respective radio channels. The data packet generating block extracts a data region or regions from one or plural received data frames, generates plural data blocks having the same packet time length, and generates data packets by adding necessary header information to the data blocks. The packet switching block correlates the data packets generated by the data packet generating block with radio channels to be used for transmission, respectively.

The data frame management block determines one or plural data frames from which to generate data packets on the basis of pieces of information relating to respective data frames that are communicated from the transmission buffer block and information relating to radio channels that is communicated from the channels' occupation status analyzing block, determines a method for generating plural data packets from one or plural data frames in accordance with the number of idle channels, determines radio channels on which to transmit the plural generated data packets, gives the transmission buffer block designation of a data frame or frames to be output, informs the data packet generating block of a method for generating data packets from one or plural data frames that are output from the transmission buffer block, and communicates, to the packet switching block, information that is necessary for correlating the data packets with the radio channels. As such, the data frame management block performs a control for transmitting plural data packets simultaneously between the two STAs using plural idle radio channels.

A nineteenth aspect of the invention further includes in the eighteenth aspect of the invention, MIMO block that transmits plural independent signals simultaneously on the respective radio channels.

According to a twentieth aspect of the invention, in the eighteenth or nineteenth aspect of the invention, the data frame management block performs a control for generating plural data packets having the same packet time length from one or plural data frames when it is detected by the carrier sensing that plural radio channels are idle at the same time.

According to a twenty-first aspect of the invention, in the eighteenth or nineteenth aspect of the invention, the two STAs include block capable of setting transmission rates for respective radio channels, and that the data frame management block performs a control for generating plural data packets having the same packet time length from one or plural data frames in accordance with transmission rates of plural idle radio channels when it is detected by the carrier sensing that plural radio channels are idle at the same time.

According to the twenty-second aspect of the invention, in the eighteenth or nineteenth aspect of the invention, the two STAs include block capable of setting transmission rates for respective radio channels, and that the data frame management block performs controls for setting transmission rates of plural idle radio channels to the same transmission rate and for generating plural data packets having the same packet time length from one or plural data frames when it is detected by the carrier sensing that plural radio channels are idle at the same time.

A twenty-third aspect of the invention further includes, in the eighteenth or nineteenth aspect of the invention, block that, while its own station is performing a transmission on at least one radio channel, selects, from idle radio channels, a radio channel or channels that do not receive influence of leakage power from the radio channel being used for the transmission.

A twenty-fourth aspect of the invention further includes, in the eighteenth or nineteenth aspect of the invention, block that, while its own station is performing a transmission on at least one radio channel, prohibits transmission process including carrier sensing until completion of the transmission.

According to a twenty-fifth aspect of the invention, in the eighteenth or nineteenth aspect of the invention, the data frame management block includes means that selects, on the basis of at least one of the number of idle channels, a MIMO number of each radio channel, and the number of transmission-standby data frames, one of a first mode in which a single radio channel is used and MIMO is not used, a second mode in which a single radio channel and MIMO are used, a third mode in which plural radio channels are used and MIMO is not used, and a fourth mode in which plural radio channels and MIMO are used.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

First Embodiment

Figure 1:
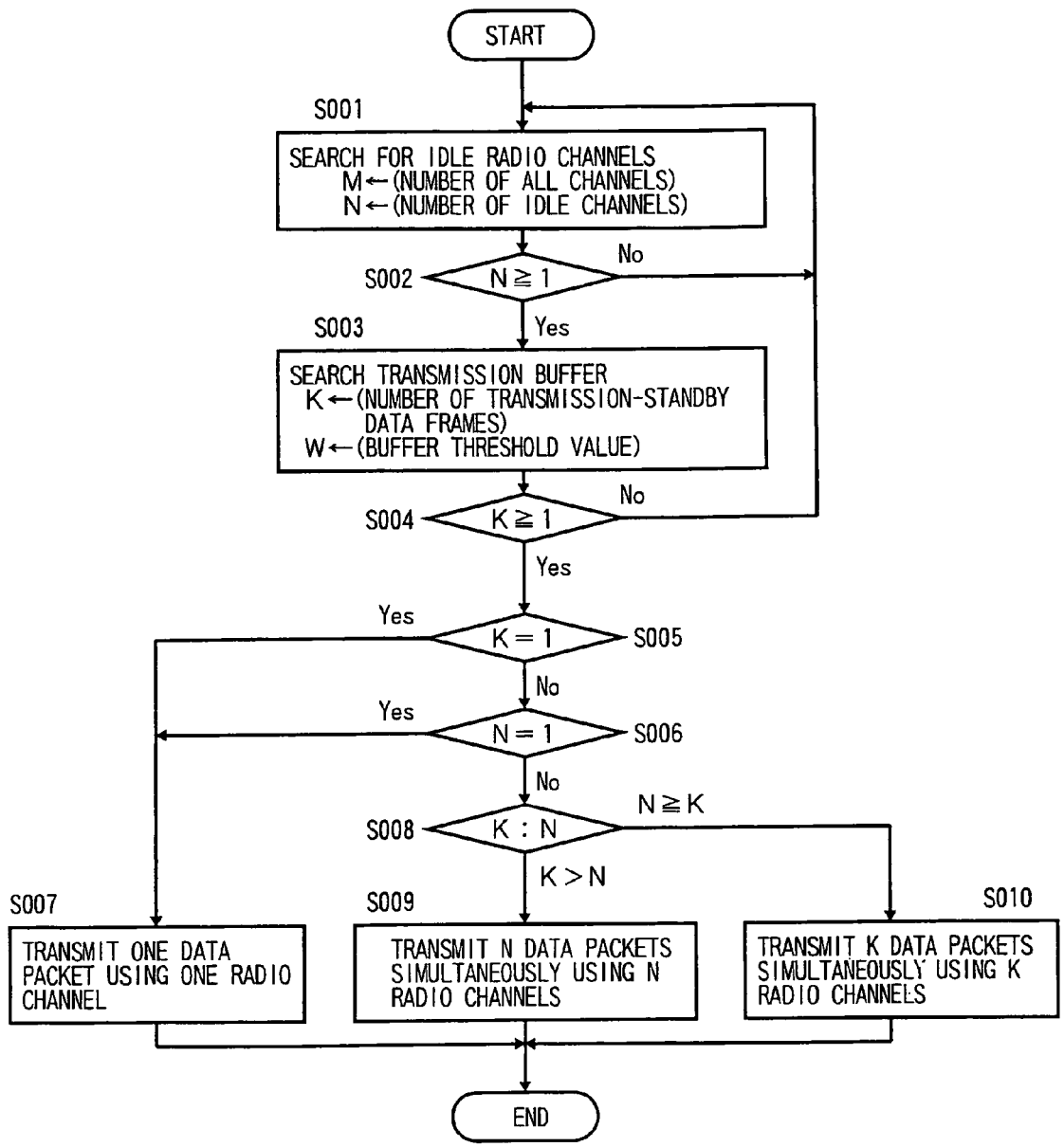
FIG. 1 is a flowchart showing a process of a first embodiment of the present invention.
Figure 2:
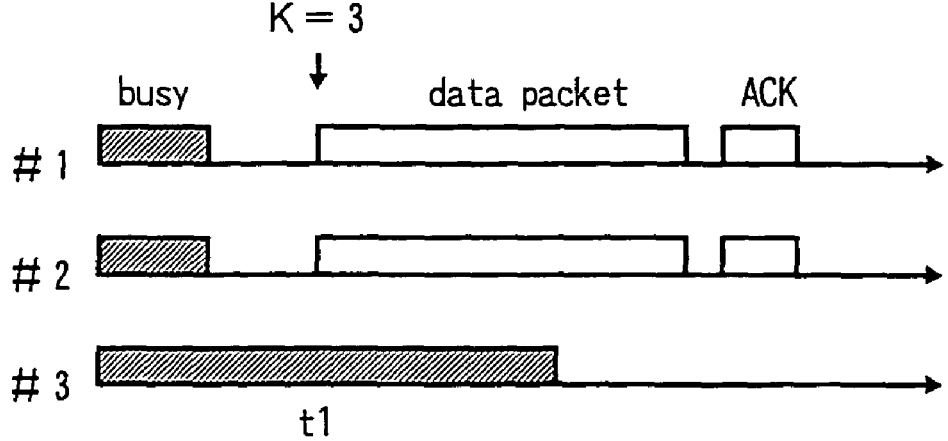
FIG. 2 has time charts showing exemplary operations of the first embodiment of the invention.
Figure 2:
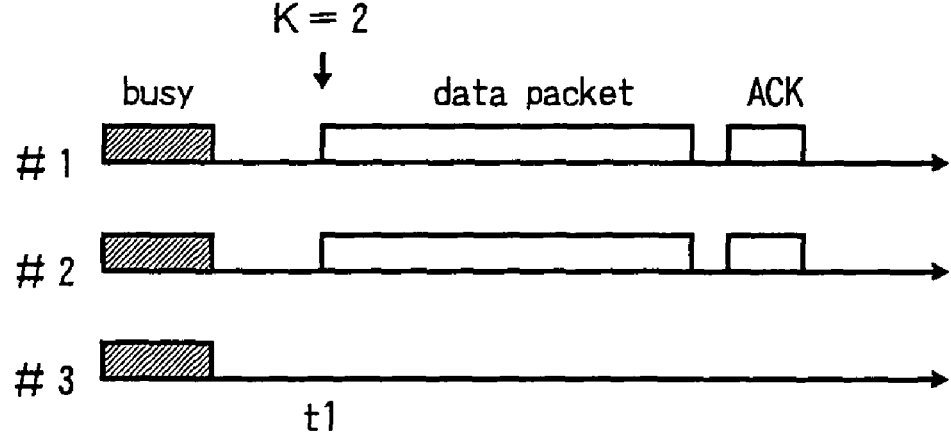

FIG. 1 is a flowchart showing a first embodiment of the present invention. FIG. 2 shows exemplary operations of the first embodiment of the invention. It is assumed here that radio channels #1, #2, and #3 are prepared between two STAs. The following description will be made with an assumption that transmission-standby data frames in a transmission buffer are to be transmitted between the two STAs and have the same destination.

Idle radio channels are searched for from all available radio channels by carrier sensing (S001). The number of all channels is represented by M and the number of detected idle channels is represented by N. If one or more idle radio channels are detected, the number K of transmission-standby data frames is acquired by searching the transmission buffer (S002, S003). If no transmission-standby data frame is detected (K=0), the process returns to the carrier sensing. If the number K of transmission-standby data frames is larger than or equal to 1, the process moves to the next step (S004). If K=1 or N=1, one data packet is generated from one data frame and is transmitted by using one radio channel (S005, S006, S007).

If K≧2 and N≧2, first, the number K of transmission-standby data frames is compared with the number N of idle channels (S008). If K>N, N data packets are generated by selecting N data frames from the K data frames and are transmitted simultaneously by using the N (i.e., all) radio channels (S009). In this case, the (K−N) data frames are caused to stand by until the next transmission opportunity. On the other hand, if N≧K, K data packets are generated by selecting the K (i.e., all) data frames and are transmitted simultaneously by using K radio channels (S010). In this case, the (N−K) radio channels are kept idle. The above process is executed repeatedly.

The example of FIG. 2(1) corresponds to step S009. At time t1, carrier sensing finds that two radio channels #1 and #2 are idle at the same time and the number K of transmission-standby data frames is equal to 3. Therefore, two data packets are generated and transmitted simultaneously by using radio channels #1 and #2. The example of FIG. 2(2) corresponds to step S010. At time t1, carrier sensing finds that three radio channels #1-#3 are idle at the same time and the number K of transmission-standby data frames is equal to 2. Therefore, two data packets are transmitted simultaneously by using radio channels #1 and #2, for example.

As described above, if plural idle radio channels exist at the same time, plural data packets are generated by selecting plural data packets from plural data frames and are transmitted simultaneously by using plural radio channels. Therefore, the number of data frames that can be transmitted in a unit time can be increased greatly.

Radio channel #3 shown in FIG. 2(2) and a radio channel that has become idle as a result of completion of a transmission can be used for an independent transmission and can be used for, for example, a communication with another STA. If plural such (i.e., idle) radio channels exist, transmissions can be performed simultaneously in the same manner as described above.

If excess radio channels exist as in the case of FIG. 2(2), a diversity effect may be obtained on the reception side by copying part of data packets transmitting those simultaneously.

Second Embodiment

Figure 3:
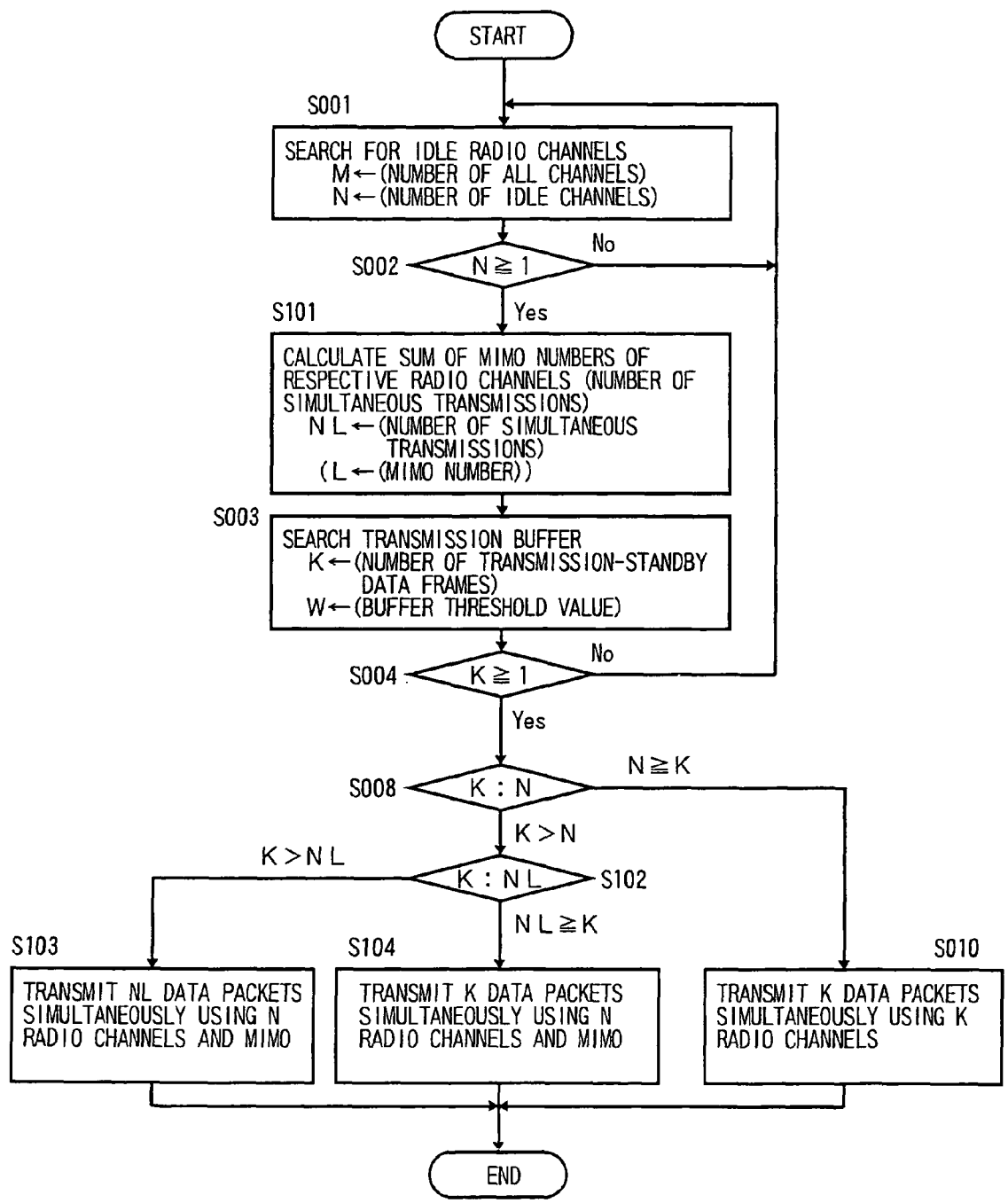
FIG. 3 is a flowchart showing a process of a second embodiment of the invention.
Figure 4:
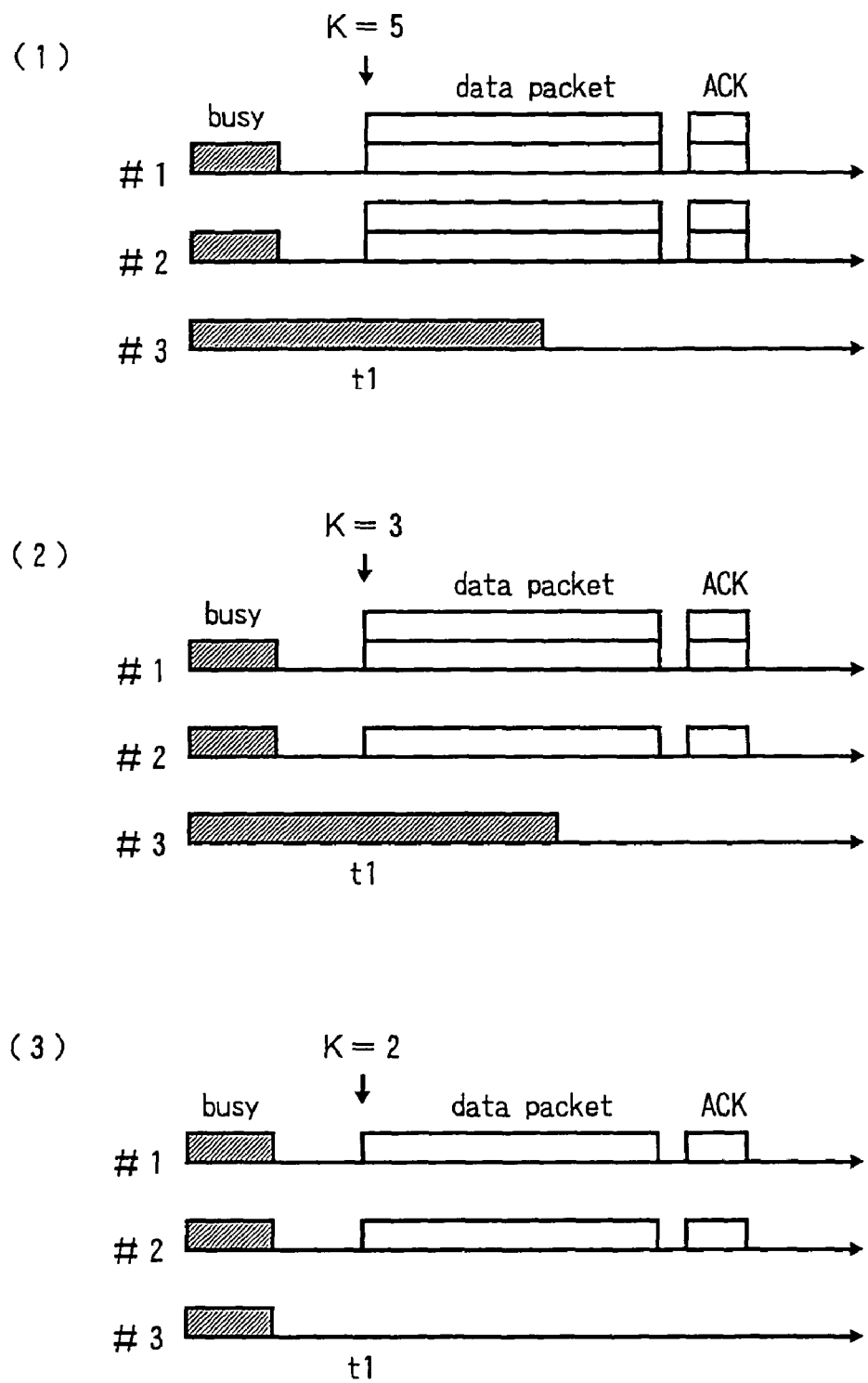
FIG. 4 has time charts showing exemplary operations of the second embodiment of the invention.

FIG. 3 is a flowchart showing a second embodiment of the invention. FIG. 4 shows exemplary operations of the second embodiment of the invention. It is assumed here that radio channels #1, #2, and #3 are prepared between two STAs. The following description will be made with an assumption that transmission-standby data packets in a transmission buffer are to be transmitted between the two STAs and have the same destination.

An important feature of this embodiment, which differentiates this embodiment from the first embodiment, is to use MIMO. Idle radio channels are searched for from all available radio channels by carrier sensing (S001). The number of all channels is represented by M and the number of detected idle channels is represented by N. If one or more idle radio channels are detected, the sum of MIMO numbers of the respective radio channels is calculated as the number of simultaneous transmissions (S002, S101). For the sake of simplicity, the following description will be made with an assumption that the MIMO numbers of the respective radio channels are the same and the number of simultaneous transmissions is equal to the product (NL) of the number N of idle channels and the MIMO number L.

Then, the number K of transmission-standby data frames is acquired by searching the transmission buffer (S003). If no transmission-standby data frame is detected (K=0), the process returns to the carrier sensing. If the number K of transmission-standby data frames is larger than or equal to 1, the process moves to the next step (S004). If K=1, one data packet is transmitted by using one radio channel as in the case of the first embodiment (this step is omitted in FIG. 3).

If K≧2 and NL≧2, first, the number K of transmission-standby data frames is compared with the number N of idle channels (S008). If N≧K, K data packets are generated by selecting the K (i.e., all) data frames and are transmitted simultaneously by using K radio channels (S010). In this case, MIMO is not used and the (N−K) radio channels are kept idle. On the other hand, if K>N, the number K of transmission-standby data frames is compared with the number of simultaneous transmissions NL (S102). If K>NL, NL data packets are generated by selecting NL data frames from the K data frames and are transmitted simultaneously by using the N (i.e., all) radio channels and MIMO (S103). In this case, the (K−NL) data frames are caused to stand by until the next transmission opportunity.

If NL≧K, K data packets are generated from the K (i.e., all) data frames and are transmitted simultaneously by using the N radio channels and MIMO (S104). The MIMO number per radio channel is set larger than or equal to floor(K/N) and smaller than or equal to ceil(K/N), where floor(x) means the maximum integer that is smaller than or equal to x (rounding down) and ceil(x) means the minimum integer that is greater than or equal to x (rounding up).

The example of FIG. 4(1) corresponds to step S103. At time t1, carrier sensing finds that two radio channels #1 and #2 are idle at the same time, the MIMO number L of each radio channel is equal to 2, and the number K of transmission-standby data frames is equal to 5. Therefore, four data packets are generated and transmitted simultaneously by using radio channels #1 and #2 and MIMO.

The example of FIG. 4(2) corresponds to step S104. At time t1, carrier sensing finds that two radio channels #1 and #2 are idle at the same time, the MIMO number L of each radio channel is equal to 3, and the number K of transmission-standby data frames is equal to 3. In this case, three data packets are transmitted simultaneously by using radio channels #1 and #2 and MIMO. At step S104, to make maximum use of MIMO, it is possible to transmit three data packets simultaneously by MIMO using one radio channel that corresponds to ceil(K/L).

The example of FIG. 4(3) corresponds to step S010. At time t1, carrier sensing finds that three radio channels #1-#3 are idle at the same time and the number K of transmission-standby data frames is equal to 2. Therefore, two data packets are transmitted simultaneously by using radio channels #1 and #2, for example. In this case, MIMO is not used.

Third Embodiment

Figure 5:
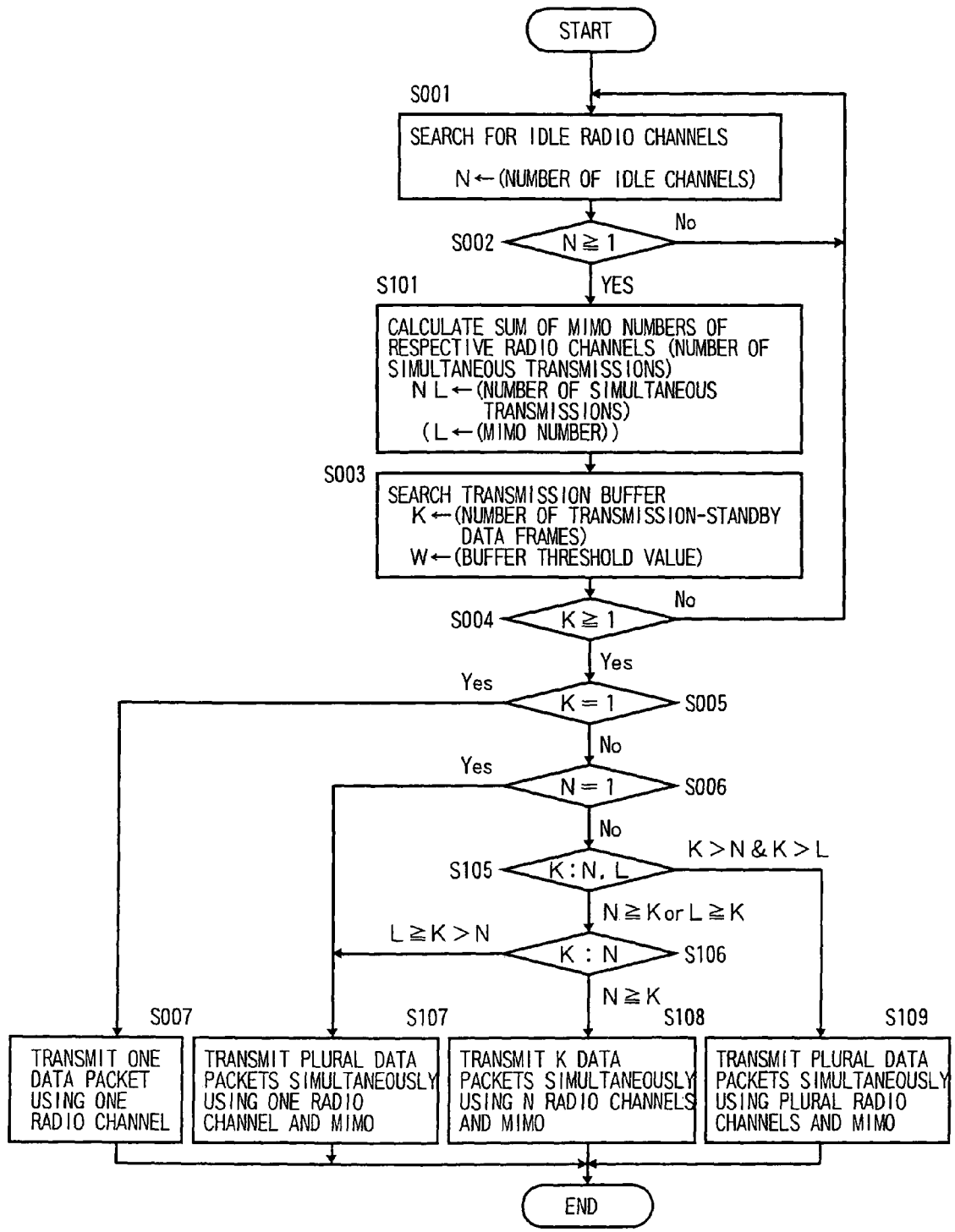
FIG. 5 is a flowchart showing a process of a third embodiment of the invention.
Figure 6:
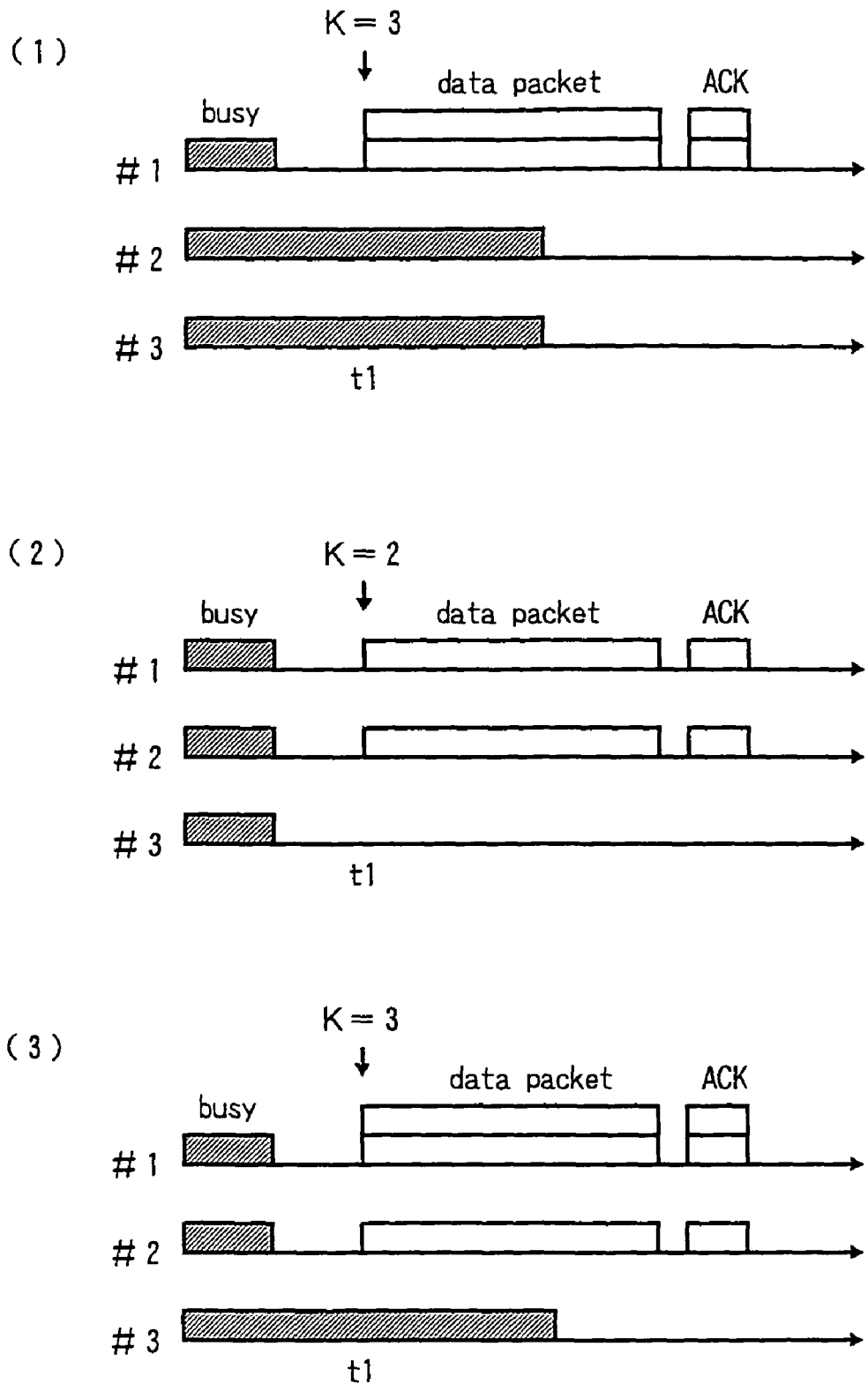
FIG. 6 has time charts showing exemplary operations of the third embodiment of the invention.

FIG. 5 is a flowchart showing a third embodiment of the invention. FIG. 6 shows exemplary operations of the third embodiment of the invention. It is assumed here that radio channels #1, #2, and #3 are prepared between two STAs. The following description will be made with an assumption that transmission-standby data packets in a transmission buffer are to be transmitted between the two STAs.

An important feature of this embodiment, which differentiates this embodiment from the second embodiment, is to properly use plural radio channels and MIMO in accordance with the number N of idle channels, the MIMO number L, and the number K of transmission-standby data frames. More specifically, selection is made among a first mode in which a single radio channel is used and MIMO is not used, a second mode in which a single radio channel and MIMO are used, a third mode in which plural radio channels are used and MIMO is not used, and a fourth mode in which plural radio channels and MIMO are used.

If the number K of transmission-standby data frames is equal to 1, one data packet is generated from one data frame and is transmitted by using one radio channel (S005, S007; first mode). If the number K of transmission-standby data frames is larger than or equal to 2, the number N of idle radio channels is checked. If N=1, plural data packets are generated by selecting plural (in L at the maximum) data frames from the K data frames and are transmitted simultaneously using the one radio channel and MIMO (S006, S107; second mode).

If N≧2, the number K of transmission-standby data frames is compared with the number N of idle radio channels and the MIMO number L. If K>N and K>L, it is impossible to transmit all data packets using only plural radio channels or one radio channel and MIMO. Therefore, plural data packets are generated by selecting plural (LN at the maximum) data frames from the K data frames and are transmitted simultaneously by using plural radio channels and MIMO (S105, S109; fourth mode). The MIMO number per radio channel is set larger than or equal to floor(K/N) and smaller than or equal to ceil(K/N).

If N≧K or L≧K, K is compared with N. If N≧K, K data packets are generated from the K (i.e., all) data frames and are transmitted simultaneously by using K radio channels (S106, S108; third mode). In this case, MIMO is not used. On the other hand, if K>N, all data packets can be transmitted by using one radio channel because L≧K. Therefore, K data packets are generated from the K (i.e., all) data frames and are transmitted simultaneously by using one radio channel and MIMO (S107).

The example of FIG. 6(1) corresponds to steps S006 and S007. At time t1, carrier sensing finds that radio channel #1 is idle, the MIMO number L is equal to 2, and the number K of transmission-standby data frames is equal to 3. Therefore, two data packets are transmitted simultaneously by using radio channel #1 and MIMO.

The example of FIG. 6(2) corresponds to step S108. At time t1, carrier sensing finds that three radio channels #1, #2, and #3 are idle at the same time and the number K of transmission-standby data frames is equal to 2. Therefore, two data packets are transmitted simultaneously by using radio channels #1 and #2. In this case, MIMO is not used.

The example of FIG. 6(3) corresponds to step S108. At time t1, carrier sensing finds that two radio channels #1 and #2 are idle at the same time, the MIMO number L of each radio channel is equal to 2, and the number K of transmission-standby data frames is equal to 3. In this case, three data packets are transmitted simultaneously by using radio channels #1 and #2 and MIMO.

It is also possible to employ only the first to third modes, for example. This corresponds to a case that condition 1 "priority is given to one of the MIMO and the simultaneous use of plural channels, the one enabling simultaneous transmission of more data frames" and condition 2 "a higher priority is given to the simultaneous use of plural channels than to the MIMO" are set and condition 1 takes priority over condition 2.

Fourth Embodiment

In the above-described embodiments, when the number K of transmission-standby data frames is larger than the number N of idle channels or the number of simultaneous transmissions NL (K>N or K>NL), as large a number of transmission-standby data frames as possible are transmitted by using all the radio channels as in the cases of step S009 of the first embodiment, step S103 of the second embodiment, and step S109 of the third embodiment. However, a part of the data frames remain untransmitted and stand by until the next transmission opportunity. In this kind of situation, waiting for satisfaction of a condition (N≧K) for enabling all the data frames to be transmitted at one time may increase the transmission efficiency. However, waiting for satisfaction of such a condition limitlessly may lower the transmission efficiency contrary to the intention, and hence a certain time-related limitation is necessary. It is also necessary to take the storage status of the transmission buffer into consideration.

Figure 7:
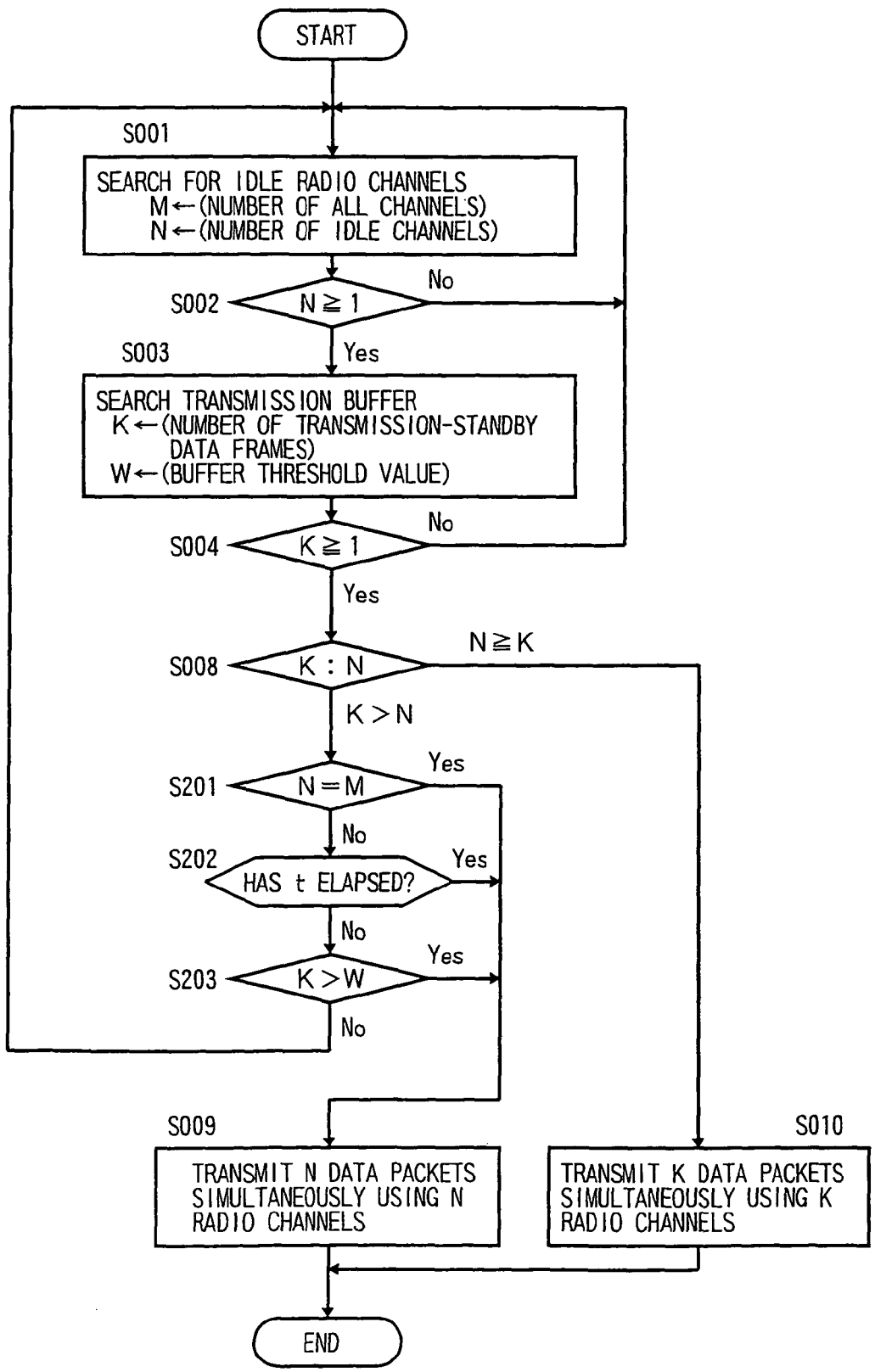
FIG. 7 is a flowchart showing a process of a fourth embodiment of the invention.

FIG. 7 is a flowchart showing a fourth embodiment of the invention. This embodiment is directed to a waiting condition in the case of K>N in the first embodiment.

If all the channels are judged idle (N=M) before a relationship N≧K is satisfied after a judgment result K>N was produced at step S008, waiting does not produce an opportunity to transmit K data packets simultaneously. Therefore, N data packets that are generated through selection from the K data frames are transmitted simultaneously by using the N radio channels (S201, S009).

If not all of the channels are idle (M>N), waiting is done until a prescribed time t elapses from the start of this process before the relationship N≧K is satisfied or the number K of data frames in the transmission buffer exceeds the buffer threshold value W before the relationship N≧K is satisfied. N data packets that are generated through selection from the K data frames at that time point are transmitted simultaneously by using the N radio channels (S202, S203, S009). The buffer threshold value W may have a data frame number or a total data size of data frames as a unit.

Fifth Embodiment

Figure 8:
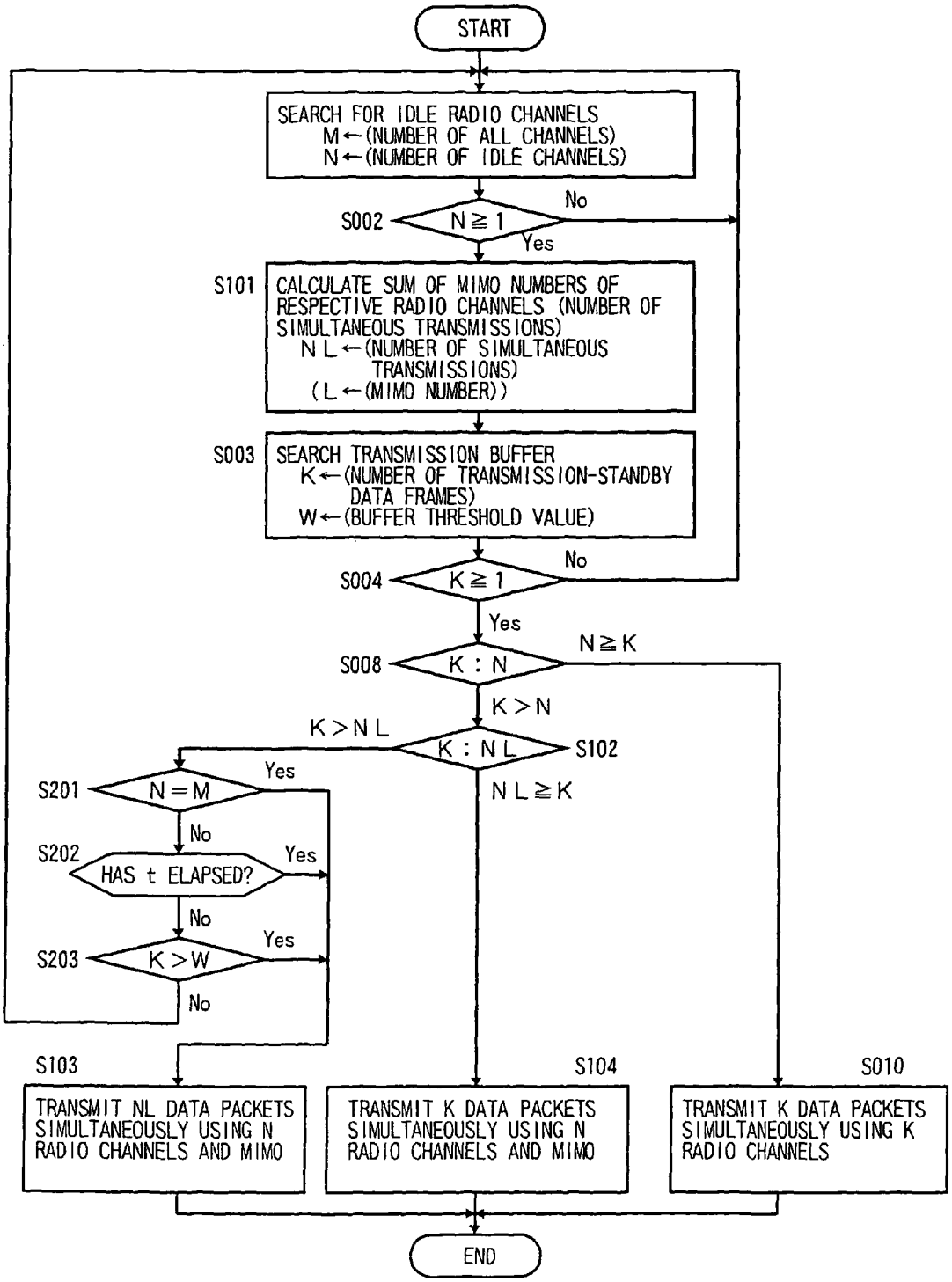
FIG. 8 is a flowchart showing a process of a fifth embodiment of the invention.

FIG. 8 is a flowchart showing a fifth embodiment of the invention. This embodiment is directed to a waiting condition in the case of K>NL in the second embodiment.

If all the channels are judged idle (N=M) before a relationship NL≧K is satisfied after a judgment result K>NL was produced at step S102, waiting does not produce an opportunity to transmit K data packets simultaneously. Therefore, NL data packets that are generated through selection from the K data frames are transmitted simultaneously by using the N radio channels and MIMO (S201, S103).

If not all of the channels are idle (M>N), waiting is done until a prescribed time t elapses from the start of this process before the relationship NL≧K is satisfied or the number K of data frames in the transmission buffer exceeds the buffer threshold value W before the relationship NL≧K is satisfied. NL data packets that are generated through selection from the K data frames at that time point are transmitted simultaneously by using the N radio channels and MIMO (S202, S203, S103). The buffer threshold value W may have a data frame number or a total data size of data frames as a unit.

Sixth Embodiment

In the above-described embodiments, when the number K of transmission-standby data frames is smaller than the number N of idle channels or the number of simultaneous transmissions NL (N≧K or NL≧K), the number K of radio channels or the number of simultaneous transmissions NL has some margin whereas all the transmission-standby data frames are transmitted, as in the cases of step S010 of the first to fifth embodiments and step S104 of the second and fifth embodiments. In this kind of situation, waiting for satisfaction of a condition (N=K or NL=K) for enabling maximum use of radio channels may increase the transmission efficiency. However, waiting for satisfaction of such a condition limitlessly may lower the transmission efficiency contrary to the intention, and hence a certain time-related limitation is necessary. It is also necessary to take the storage status of the transmission buffer into consideration.

In the sixth embodiment, waiting is done until a transition occurs from a state of N>K to a state of N=K at step S008 of each of the first to fifth embodiments, a prescribed time t elapses from the start of this process before a relationship N=K is satisfied, or the number K of data frames in the transmission buffer exceeds the buffer threshold value W before the relationship N=K is satisfied. Then, K data packets that are generated from the K data frames are transmitted simultaneously by using the K radio channels (S010).

Likewise, waiting is done until a transition occurs from a state of NL>K to a state of NL=K at step S102 of the second or fifth embodiment, a prescribed time t elapses from the start of this process before a relationship NL=K is satisfied, or the number K of data frames in the transmission buffer exceeds the buffer threshold value W before the relationship NL=K is satisfied. Then, K data packets that are generated from the K data frames are transmitted simultaneously by using the N radio channels and MIMO (S104).

Seventh Embodiment

Figure 9:
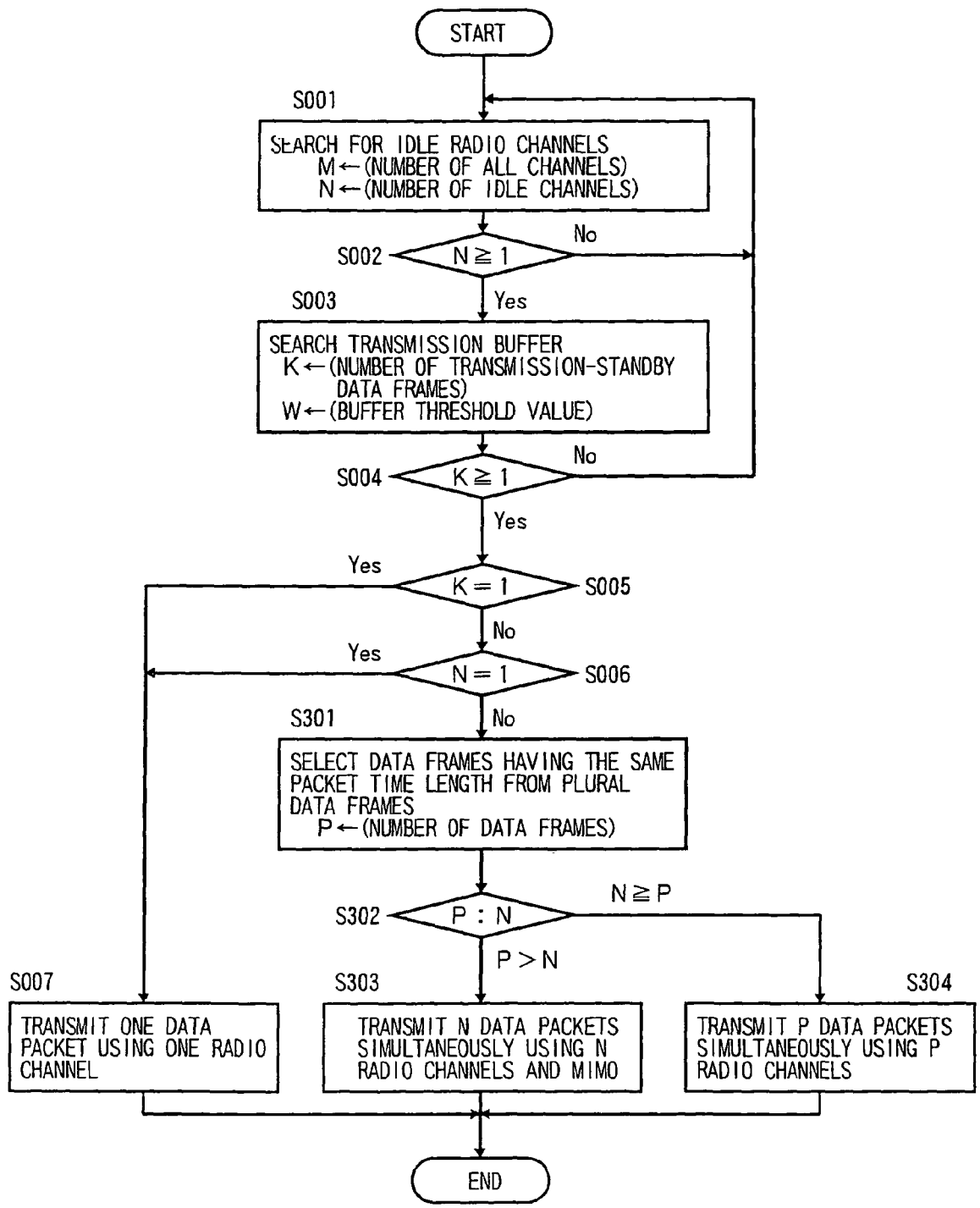
FIG. 9 is a flowchart showing a process of a seventh embodiment of the invention.

FIG. 9 is a flowchart showing a seventh embodiment of the invention. An important feature of this embodiment, which differentiates this embodiment from the first embodiment, is that data frames having the same packet time length among transmission-standby data frames in a transmission buffer to be transmitted between two STAs are subjected to processing.

Idle radio channels are searched for from all available radio channels by carrier sensing (S001). The number K of transmission-standby data frames is acquired by searching the transmission buffer (S002, S003). If K=1 or N=1, one data packet is generated from one data frame and is transmitted by using one radio channel (S005, S006, S007).

If K≧2 and N≧2, data frames having the same packet time length (i.e., data packets that are the same in the time required for transmission) and the number of those data frames is represented by P (S301). For example, the head data frame and all data frames having the same packet time length as the head data frame are selected from the data frames in the transmission buffer.

Then, the number P of data frames having the same packet time length is compared with the number N of idle channels (S302). If P>N, N data packets are generated by selecting N data frames from the P data frames and are transmitted simultaneously by using the N (i.e., all) radio channels (S303). In this case, the (P−N) data frames are caused to stand by until the next transmission opportunity. On the other hand, if N≧P, K data packets are generated by selecting the P (i.e., all) data frames and the P data packets are transmitted simultaneously by using P radio channels (S304). In this case, the (N−P) radio channels are kept idle. The above process is executed repeatedly.

According to this embodiment, in transmitting plural data packets simultaneously using plural radio channels, a phenomenon that leakage power from one radio channel influences another can be avoided by equalizing packet time lengths as shown in FIG. 2, for example. That is, since transmissions of simultaneously transmitted data packets end at the same time, ACK packets that arrive after those transmissions can be received without any influence of leakage power.

If plural simultaneously transmitted data packets have different packet time lengths, the transmissions of those data packets end at times that are different from each other by time lengths corresponding to differences between the packet time lengths. Therefore, differences corresponding to the differences between the packet time lengths occur in the reception timing of ACK packets. However, if the differences between the packet time lengths of the data packets are sufficiently small and the differences between the transmission end times of the data packets are shorter than time lengths to the starts of reception of ACK packets, the ACK packets can be received without any influence of leakage power. Therefore, for example, the number P of all data frames whose packet time lengths have sufficiently small differences among the data frames in the transmission buffer may be acquired at step S301.

As described above, when plural idle radio channels exist at the same time, plural data packets having the same packet time length are transmitted simultaneously by using the plural radio channels. This makes it possible to greatly increase the number of data packets that can be transmitted in a unit time and to increase the throughput reliably.

The process of this embodiment is such that step S301 is added to the process of the first embodiment and K is replaced by P. Likewise, the processes of the second to fifth embodiments may be modified in such a manner that step S301 is added and K is replaced by P.

Eighth Embodiment

In the above-described embodiments, the numbers of radio channels and data frames for simultaneous transmissions are correlated with each other on the basis of the relationship between the number K of transmission-standby data frames in the transmission buffer or the number P of data frames having the same packet time length among those data frames and the number N of idle channels or the number of simultaneous transmissions. An important feature of an eighth embodiment is that N data packets corresponding to the number N of idle channels are generated from one or plural transmission-standby data frames in the transmission buffer and are transmitted simultaneously.

Figure 10:
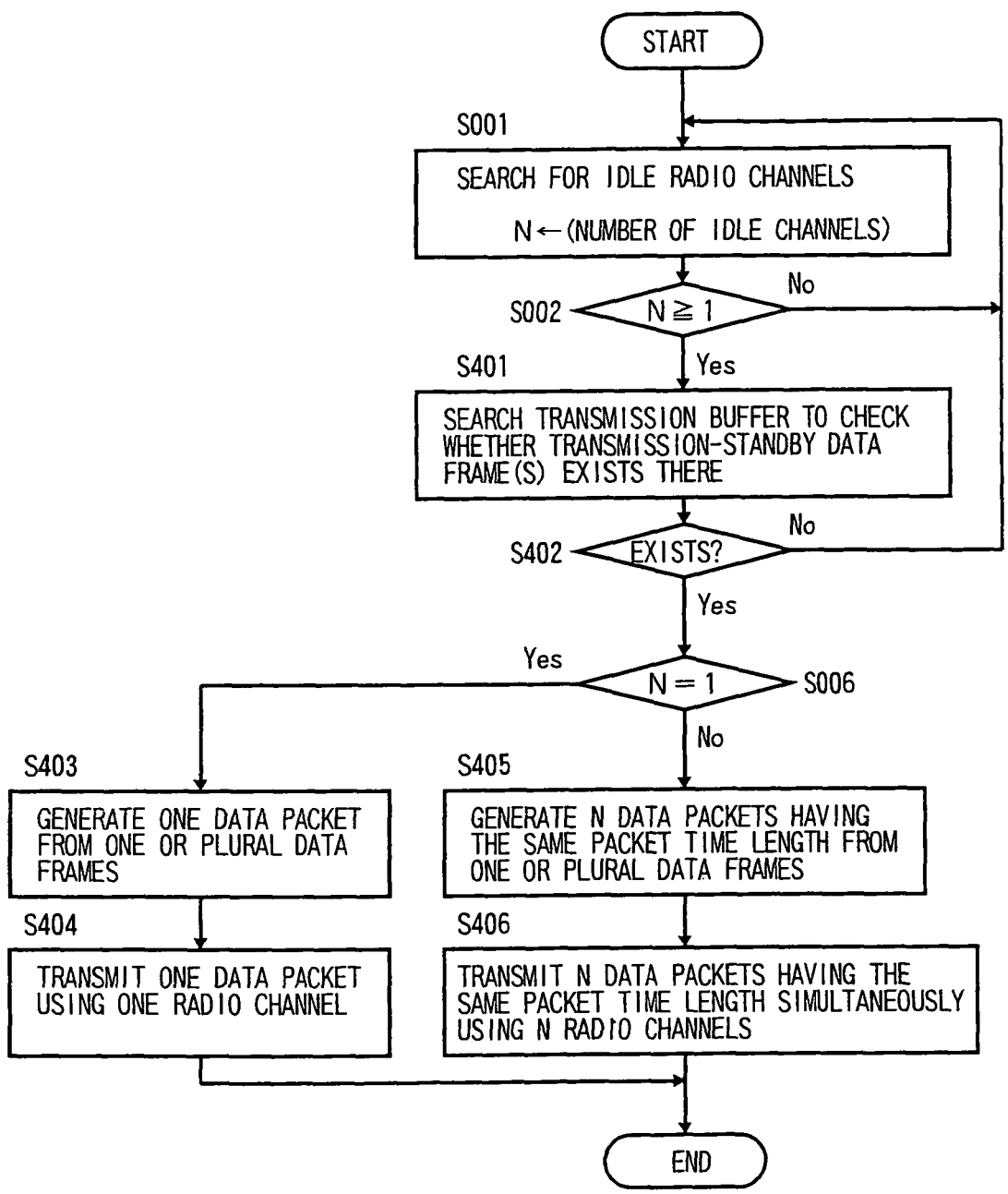
FIG. 10 is a flowchart showing a process of an eighth embodiment of the invention.

FIG. 10 is a flowchart showing the eighth embodiment of the invention. It is assumed here that all available radio channels have the same transmission rate.

Idle radio channels are searched for from all available radio channels by carrier sensing (S001). The number of detected idle channels is represented by N. If one or more idle radio channels are detected, the transmission buffer is searched to check whether a transmission-standby data frame(s) exists there (S002, S401). If no transmission-standby data frame exists, the process returns to the carrier sensing. If a transmission-standby data frame(s) exists, the process moves to the next step (S402). If N=1, one data packet is generated from one or plural data frames (S006, S403) and is transmitted by using the one radio channel (S404).

If the number N of idle channels is larger than or equal to 2, N data packets having the same packet time length (data size) are generated from one or plural data frames in the transmission buffer (S405). Then, the N data packets having the same packet time length are transmitted simultaneously by using the N radio channels (S406).

Figure 11:
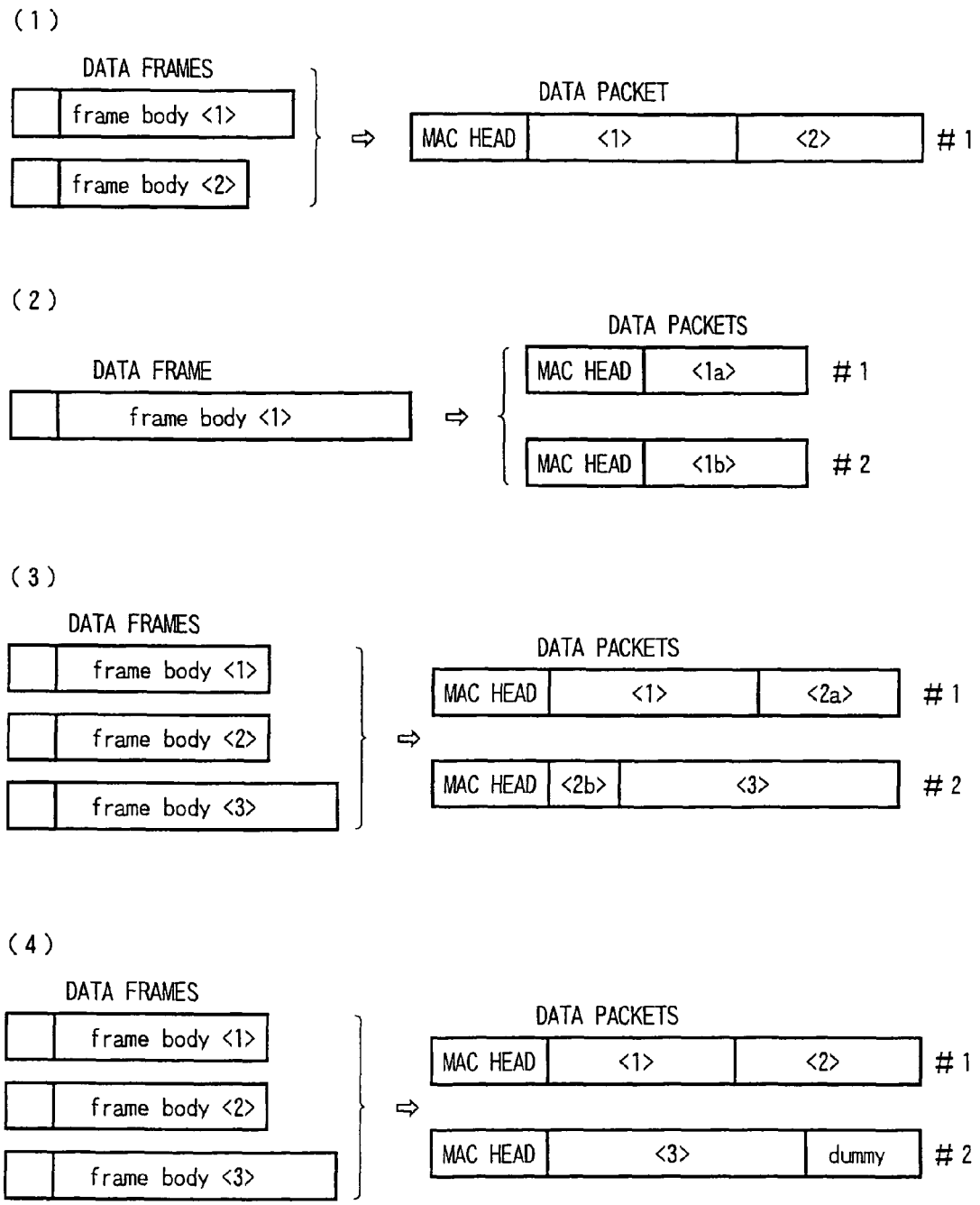
FIG. 11 illustrates methods for generating a data packet(s) from one or plural data frames.

A method for generating one data packet from one or plural data frames and methods for generating plural data packets to be transmitted simultaneously are as follows. For example, when two data frames and one idle channel exist, one data packet is generated by connecting the data frames as shown in FIG. 11(1). When one data frame and two idle channels exist, two data packets are generated by dividing the data frame as shown in FIG. 11(2). When three data frames and two idle channels exist, two data packets are generated by dividing data frame-2, for example, and connecting divisional data frames to data frame-1 and data frame-3, respectively, as shown in FIG. 11(3). The same result is obtained by connecting the three data frames and dividing a resulting data frame into two parts. As a further alternative, two data packets having the same packet time length are generated by combining data frame-1 and data frame-2 together and adding dummy bits to data frame-3 as shown in FIG. 11(4). Where plural radio channels have different transmission rates as in embodiments to be described later, the size ratio of data frames is adjusted so as to be suitable for the transmission rate ratio and to thereby equalize packet time lengths.

Ninth Embodiment

Figure 12:
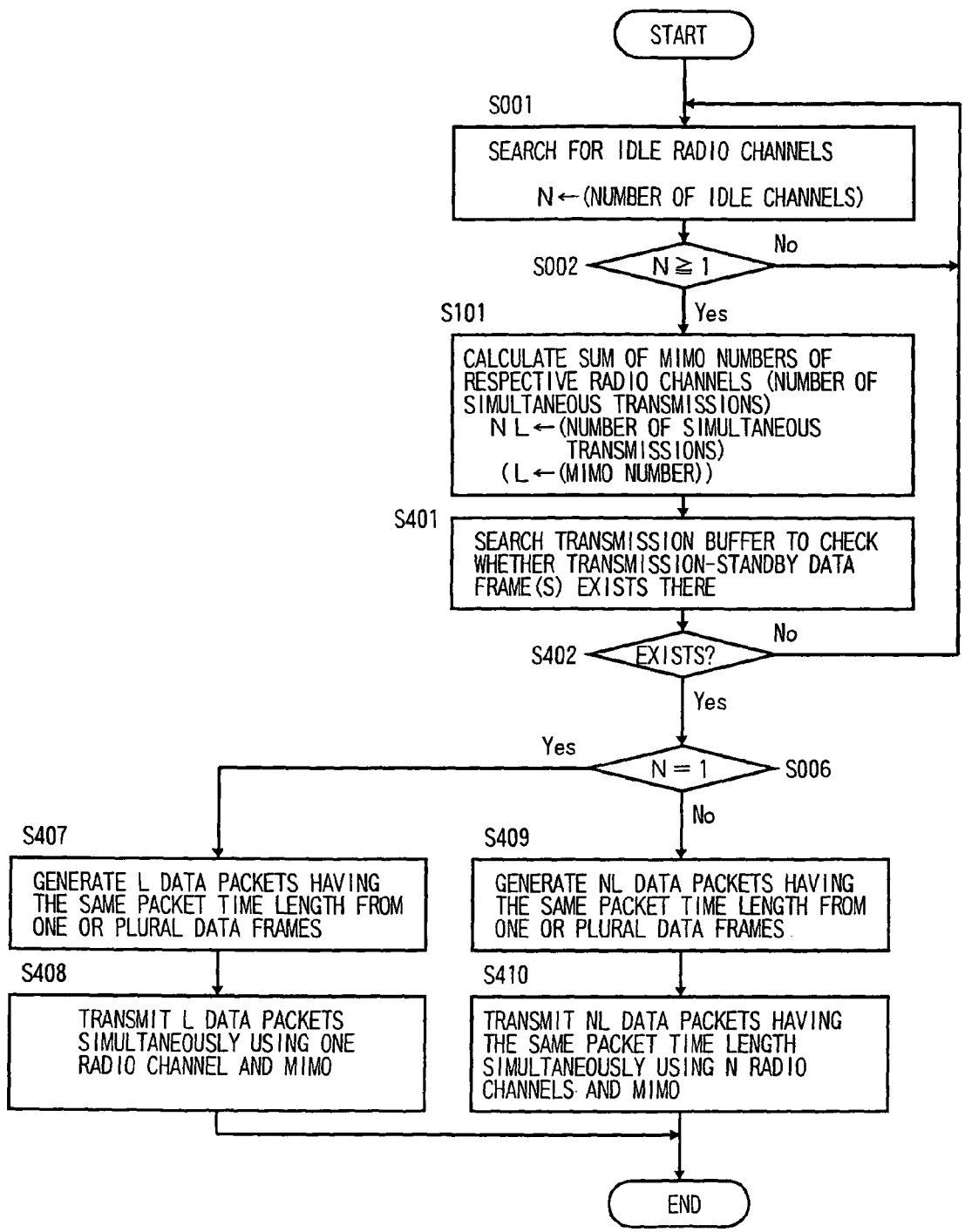
FIG. 12 is a flowchart showing a process of a ninth embodiment of the invention.

FIG. 12 is a flowchart showing a ninth embodiment of the invention. It is assumed here that all available radio channels have the same transmission rate.

An important feature of this embodiment, which differentiates this embodiment from the eighth embodiment, is to use MIMO. Idle radio channels are searched for from all available radio channels by carrier sensing (S001). The number of detected idle channels is represented by N. If one or more idle radio channels are detected, the sum of MIMO numbers of the respective radio channels is calculated as the number of simultaneous transmissions (S002, S101). For the sake of simplicity, the following description will be made with an assumption that the MIMO numbers of the respective radio channels are the same and the number of simultaneous transmissions is equal to the product (NL) of the number N of idle channels and the MIMO number L.

Then, the transmission buffer is searched to check whether a transmission-standby data frame(s) exists there (S002, S401). If no transmission-standby data frame exists, the process returns to the carrier sensing. If a transmission-standby data frame(s) exists, the process moves to the next step (S402). If N=1, L data packets having the same packet time length (data size) are generated from one or plural data frames in the transmission buffer (S006, S407) and are transmitted simultaneously by using the one radio channel and MIMO (S408).

If the number N of idle channels is larger than or equal to 2, NL data packets having the same packet time length (data size) are generated from one or plural data frames in the transmission buffer (S409). Then, the NL data packets having the same packet time length are transmitted simultaneously by using the N radio channels and MIMO (S410).

10th Embodiment

Figure 13:
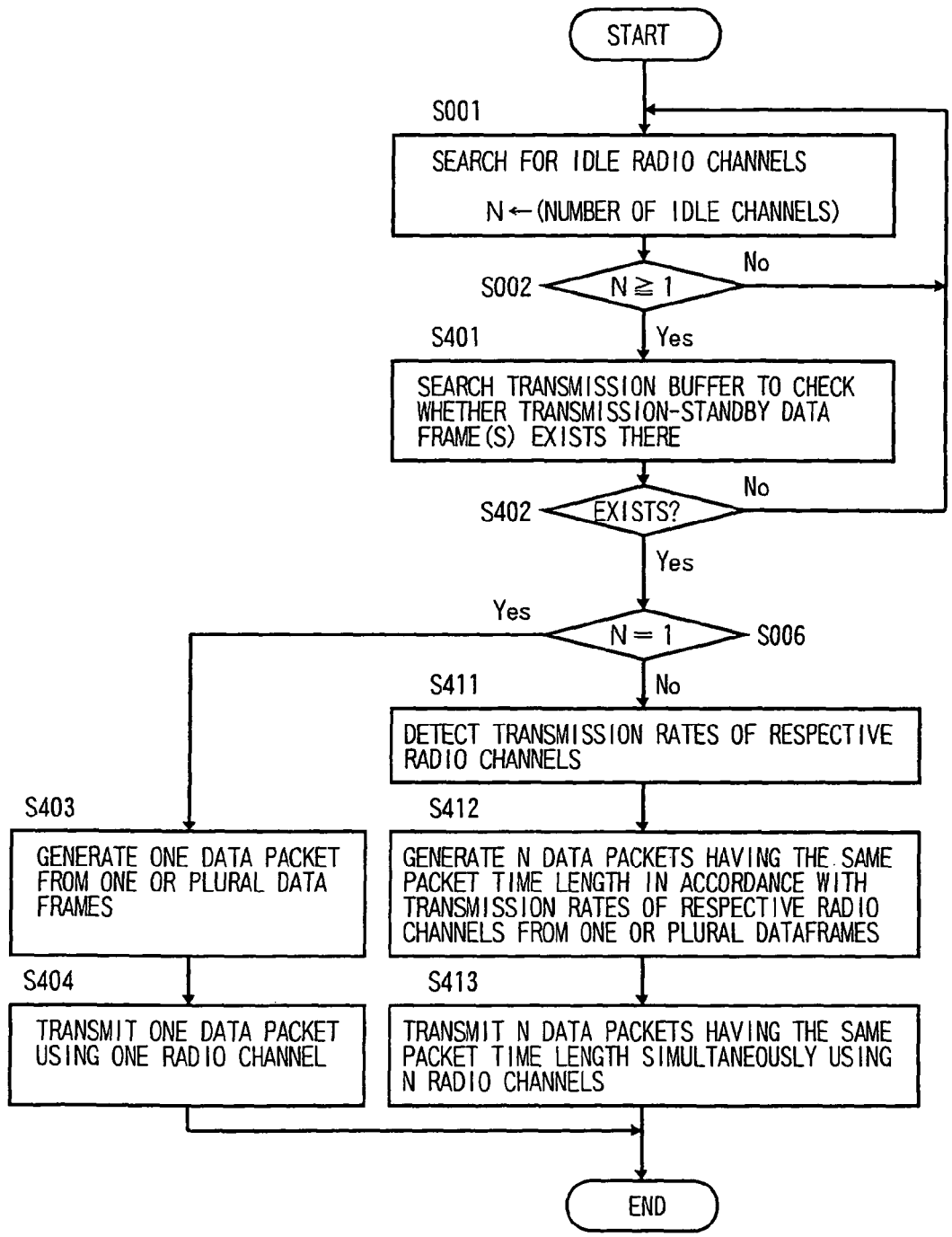
FIG. 13 is a flowchart showing a process of a 10th embodiment of the invention.

FIG. 13 is a flowchart showing a 10th embodiment of the invention. It is assumed here that the transmission rates of all available radio channels can be set for the respective radio channels.

Idle radio channels are searched for from all available radio channels by carrier sensing (S001). The number of detected idle channels is represented by N. If one or more idle radio channels are detected, the transmission buffer is searched to check whether a transmission-standby data frame(s) exists there (S002, S401). If no transmission-standby data frame exists, the process returns to the carrier sensing. If a transmission-standby data frame(s) exists, the process moves to the next step (S402). If N=1, one data packet is generated from one or plural data frames (S006, S403) and is transmitted by using the one radio channel (S404).

If the number N of idle channels is larger than or equal to 2, transmission rates of the respective radio channels are detected (S411). Then, N data packets having the same packet time length ((time required for transmission)=(packet size)/(transmission rate)) are generated from one or plural data frames in the transmission buffer in accordance with the transmission rates of the respective radio channels (S412). Then, the transmission rates of the N radio channels are correlated with the respective data packets and the N data packets having the same packet time length are transmitted simultaneously (S413).

This embodiment can similarly be applied to the ninth embodiment, which utilizes the MIMO.

Figure 14:
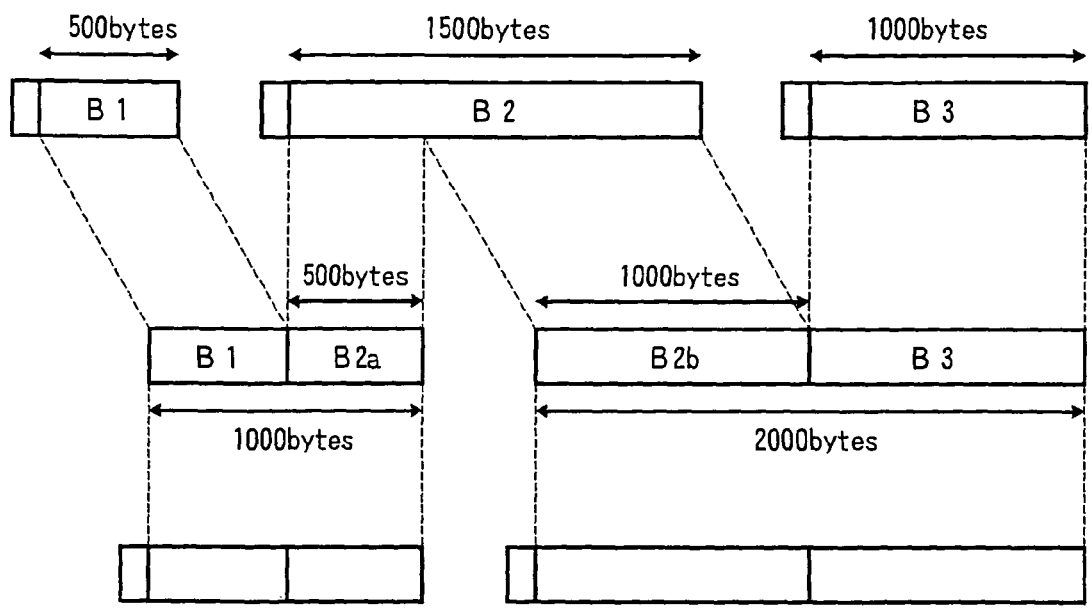
FIG. 14 illustrates methods for generating two data packets from three data frames.

A process for generating two data packets from three data frames will now be described with reference to FIG. 14 for an exemplary case that the transmission rates of two radio channels are 12 Mbit/s and 24 Mbit/s, respectively. The data regions of the three data frames contain a data block B1 of 500 bytes, a data block B2 of 1,500 bytes, and a data block B3 of 1,000 bytes, respectively. For example, the data block B2 is divided into two data blocks B2$a$ and B2$b$, which are connected to the data blocks B1 and B3, respectively. In this example, the data sizes of the data blocks B1, B2$a$, B2$b$, and B3 are 500, 500, 1,000, and 1,000, respectively. Therefore, the size of the data region of the first data frame becomes 1,000 bytes and that of the second data frame becomes 2,000 bytes. Data packets are generated by adding, to each of those data frames, control information including ID information of a destination terminal and a sequence number indicating a place of the data frame in the sequence (i.e., one of serial numbers that are independent for each address). The ratio between the sizes of the data regions of the two data packets thus generated is 1:2, which is the same as the ratio between the transmission rates of the corresponding radio channels. Therefore, the times required for transmission of the data packets, that is, their packet time lengths, are made identical.

11th Embodiment

Figure 15:
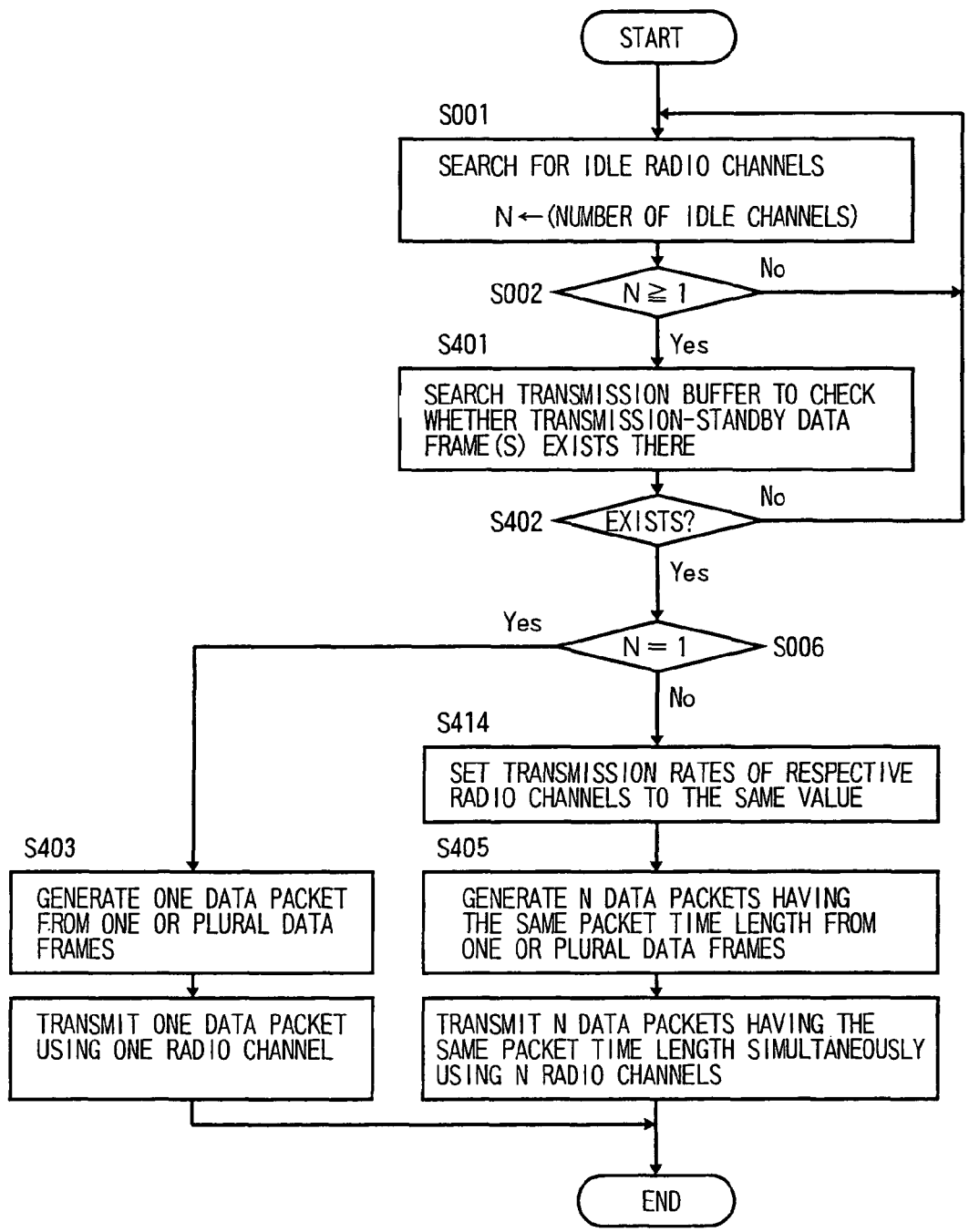
FIG. 15 is a flowchart showing a process of an 11th embodiment of the invention.

FIG. 15 is a flowchart showing an 11th embodiment of the invention. It is assumed here that the transmission rates of all available radio channels can be set for the respective radio channels.

In this embodiment, the transmission rates of respective radio channels are set to the same value (S414) instead of detecting transmission rates of respective radio channels at step S411 in the 10th embodiment. For example, the transmission rates of respective radio channels are set equal to the lowest one of those transmission rates. This enables a process that is equivalent to a process in which the transmission rates of respective radio channels are the same from the start as in the case of the eighth embodiment (S405, S406).

This embodiment can similarly be applied to the ninth embodiment, which utilizes the MIMO.

12th Embodiment

Figure 16:
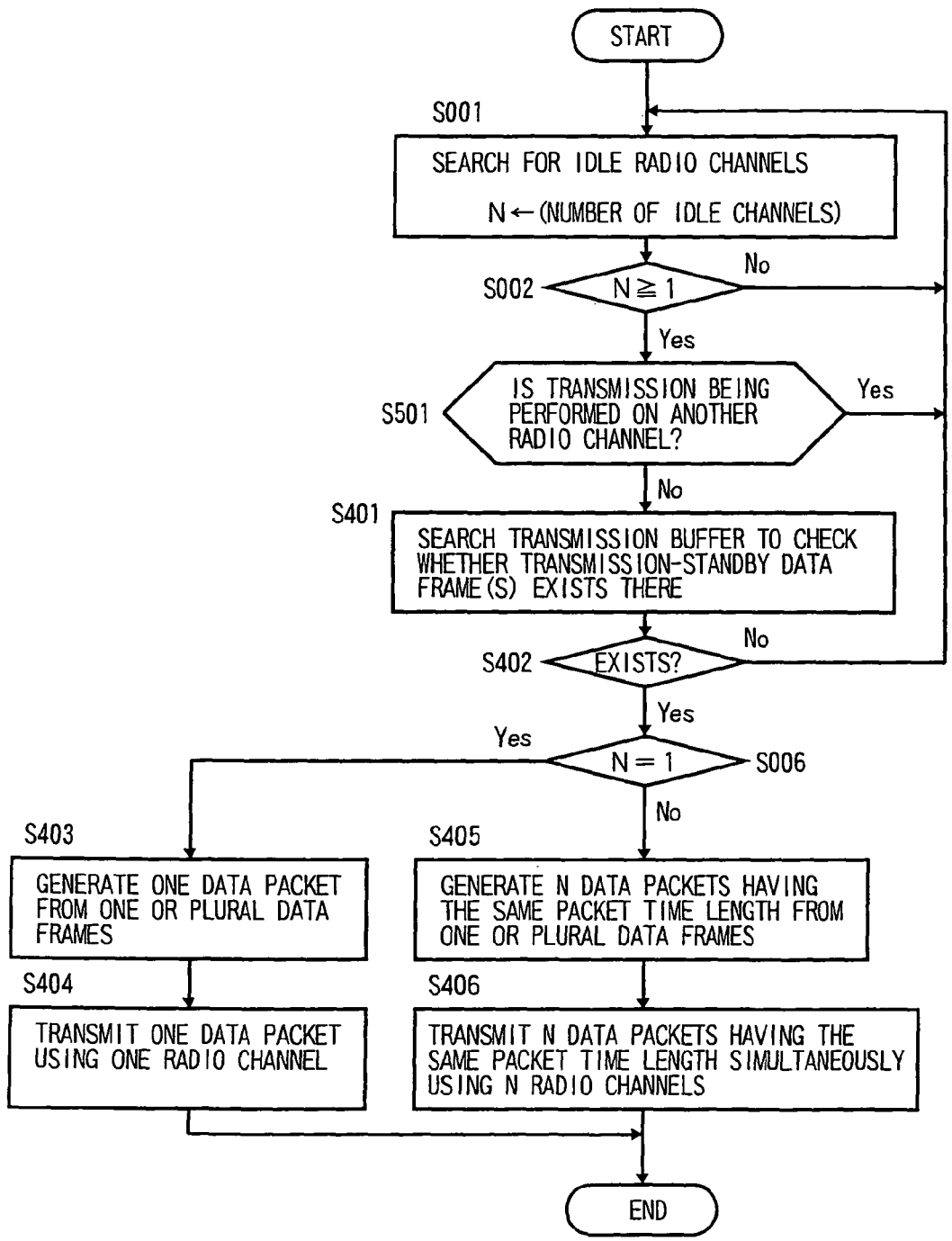
FIG. 16 is a flowchart showing a process of a 12th embodiment of the invention.
Figure 17:
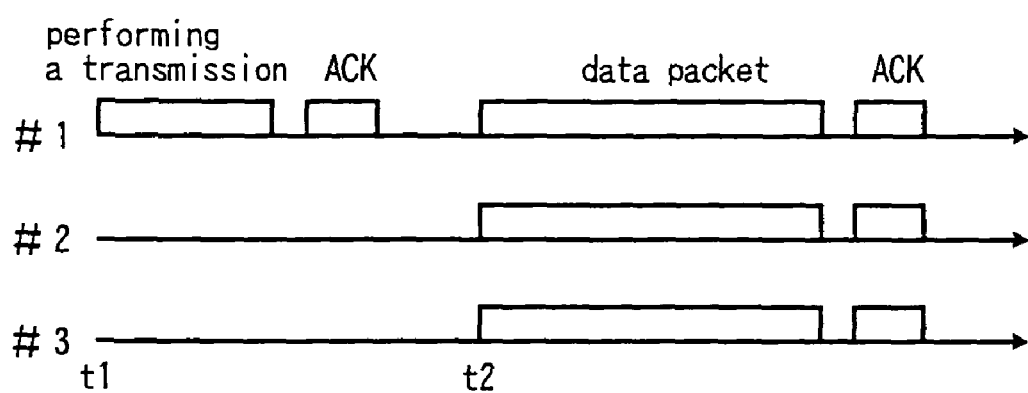
FIG. 17 is a time chart showing an exemplary operation of the 12th embodiment of the invention.

FIG. 16 is a flowchart showing a 12th embodiment of the invention. FIG. 17 shows an exemplary operation of the 12th embodiment of the invention. It is assumed here that all available radio channels have the same transmission rate.

This embodiment is such that, in the eighth embodiment, if one or more idle radio channels are detected, whether the own station is performing a transmission on another radio channel and a further transmission(s) is prohibited until the current transmission is finished (S501). In the example of FIG. 17, at time t1, a transmission is being performed on radio channel #1 though radio channels #2 and #3 are idle. Therefore, transmissions simultaneously are performed on the three channels from time t2 after completion of the current transmission. This makes it possible to prevent a phenomenon that leakage power from one radio channel influences another.

An alternative process is as follows. Radio channels that are not influenced by leakage power from a radio channel on which the own station is performing a transmission are selected from the N radio channels that were detected as idle channels at step S501. The number of those radio channels is employed as the number N of idle channels.

This embodiment can similarly be applied to the first to seventh embodiment in addition to the method of the ninth embodiment, which utilizes the MIMO, and the methods of the 10th and 11th embodiments, in which transmission rates can be set for respective STAs.

13th Embodiment

Figure 18:
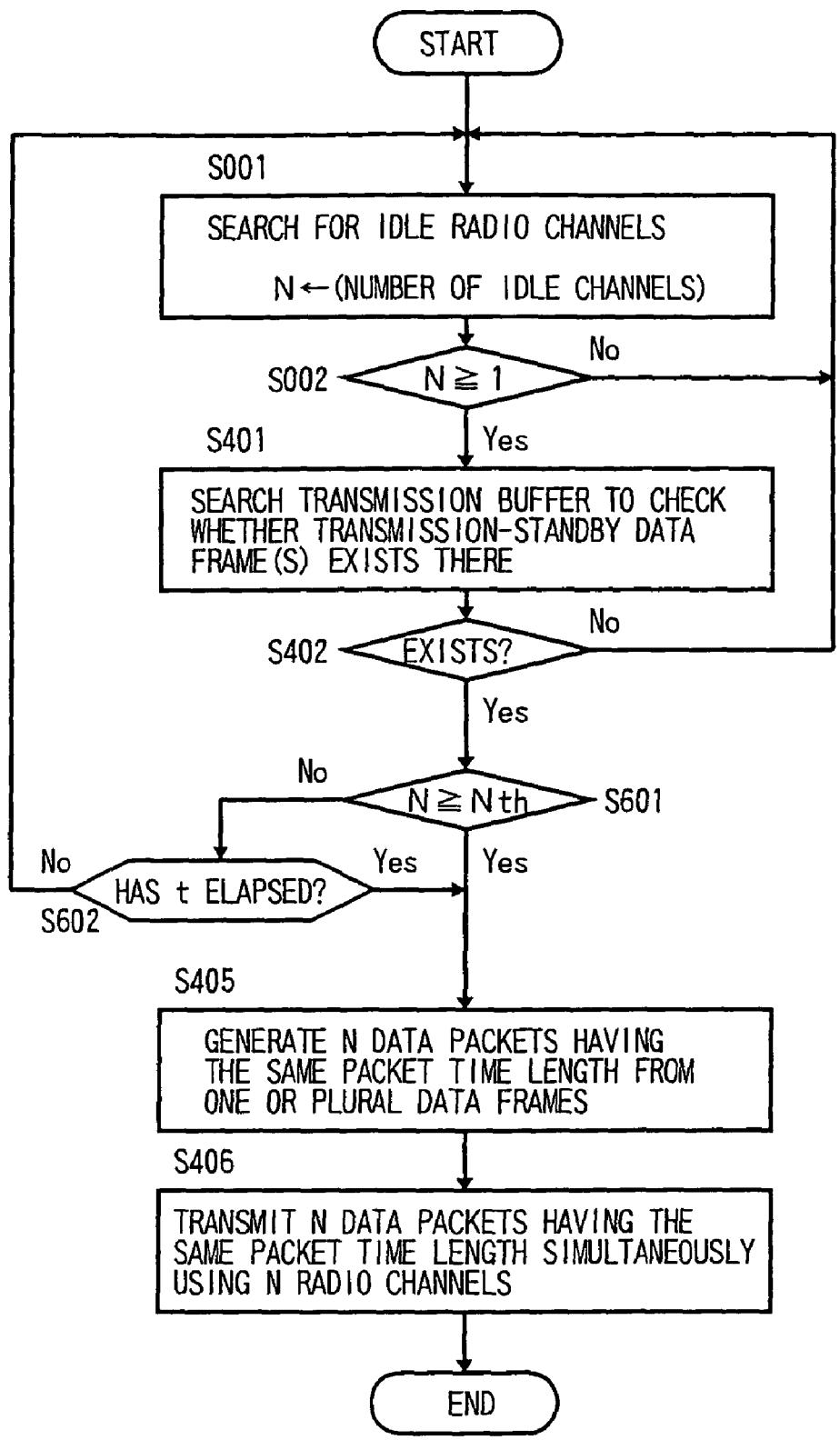
FIG. 18 is a flowchart showing a process of a 13th embodiment of the invention.
Figure 20:
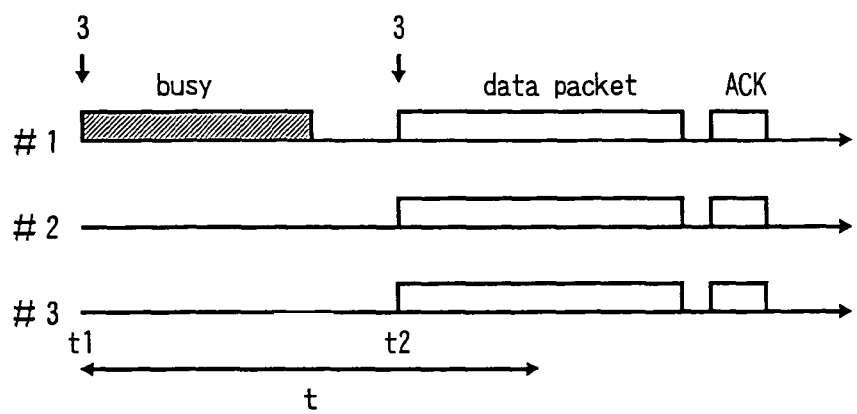
FIG. 20 is a time chart showing an exemplary operation of the 13th embodiment of the invention.

FIG. 18 is a flowchart showing a 13th embodiment of the invention. FIG. 20 shows an exemplary operation of the 13th embodiment of the invention. It is assumed here that all available radio channels have the same transmission rate.

This embodiment is such that, in the eighth embodiment, when one or more idle radio channels have been detected and a data frame(s) exists in the transmission buffer, the number N of idle channels is compared with a threshold value Nth to judge whether the number N of idle channels is sufficient (S601). If N<Nth, waiting is done until the number N of idle channels increases to satisfy a relationship N≧Nth. When the relationship N≧Nth has been satisfied, the process moves to step S405, where data packets are generated from a data frame(s).

On the other hand, if a prescribed time t elapses before satisfaction of the relationship N≧Nth (S602), the process immediately moves to step S405, where data packets are generated from a transmission-standby data frame(s). The generated data packets are transmitted by using the N radio channels.

In the example of FIG. 20, Nth is set at 3 and radio channels #2 and #3 are idle at time t1. Waiting is done because N<Nth. Since the number N of idle channels becomes 3 (N≧Nth) at time t2 before the prescribed time t elapses, transmissions simultaneously are performed by using the three radio channels.

In this embodiment, the same waiting condition as in the fourth embodiment is set. It is intended to increase the transmission efficiency by waiting when the number N of idle channels is small. However, waiting for satisfaction of the condition limitlessly may lower the transmission efficiency contrary to the intention, and hence the time-related limitation is provided. The storage status of the transmission buffer may be taken into consideration as in the fourth embodiment.

This embodiment can similarly be applied to the method of the ninth embodiment, which utilizes the MIMO, and the methods of the 10th and 11th embodiments, in which transmission rates can be set for respective radio channels. The 12th and 13th embodiments can be combined with each other.

14th Embodiment

Figure 19:
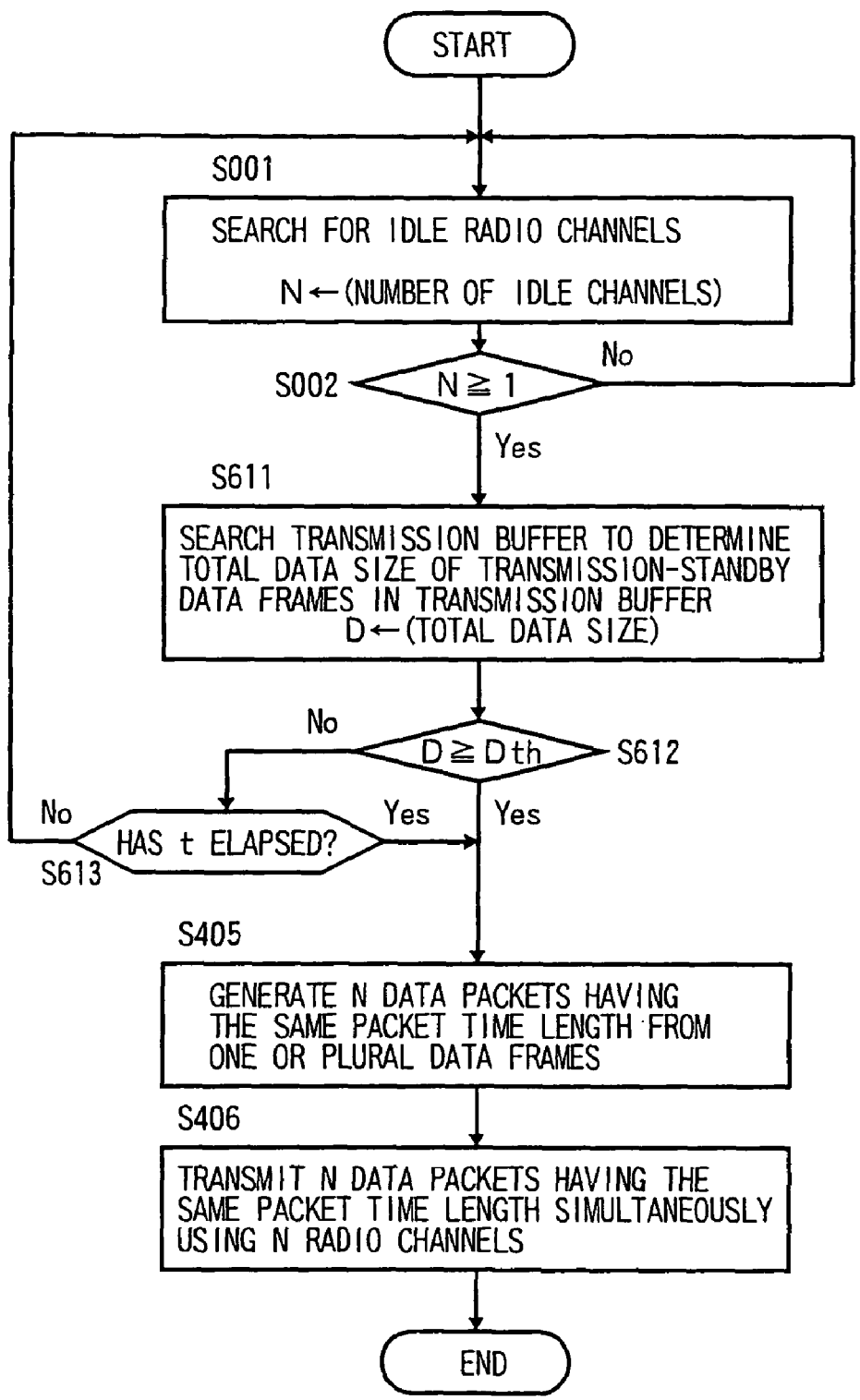
FIG. 19 is a flowchart showing a process of a 14th embodiment of the invention.

FIG. 19 is a flowchart showing a 14th embodiment of the invention. It is assumed here that all available radio channels have the same transmission rate.

This embodiment is such that, in the eighth embodiment, when one or more idle radio channels have been detected, the transmission buffer is searched to determine a total data size of transmission-standby data frames in the transmission buffer and the total data size is represented by D (S611). The total data size D is compared with a threshold value Dth (S612). If D<Dth, transmissions are not performed immediately and waiting is done until the number of transmission-standby data frames increases to such an extent that a relationship D≧Dth is satisfied. If the relationship D≧Dth is satisfied, the process moves to step S405, where data packets are generated from data frames.

On the other hand, if a prescribed time t elapses before satisfaction of the relationship D≧Dth (S613), the process immediately moves to step S405, where data packets are generated from a transmission-standby data frame(s).

In this embodiment, the same waiting condition as in the fourth embodiment is set. It is intended to increase the transmission efficiency by waiting when the total data size D of the transmission buffer is small. However, waiting for satisfaction of the condition limitlessly may lower the transmission efficiency contrary to the intention, and hence the time-related limitation is provided. The storage status of the transmission buffer may be taken into consideration as in the fourth embodiment.

This embodiment can similarly be applied to the method of the ninth embodiment, which utilizes the MIMO, and the methods of the 10th and 11th embodiments, in which transmission rates can be set for respective radio channels. The 12th and 14th embodiments can be combined with each other.

The relationship between the number N of idle channels and the threshold value Nth in the 13th embodiment and the relationship between the total data size D of the transmission buffer and the threshold value Dth in the 14th embodiment may be combined with each other. For example, the AND of the two relationships may be employed as a waiting condition.

[Configuration of Wireless Packet Communication Apparatus]

Figure 22:
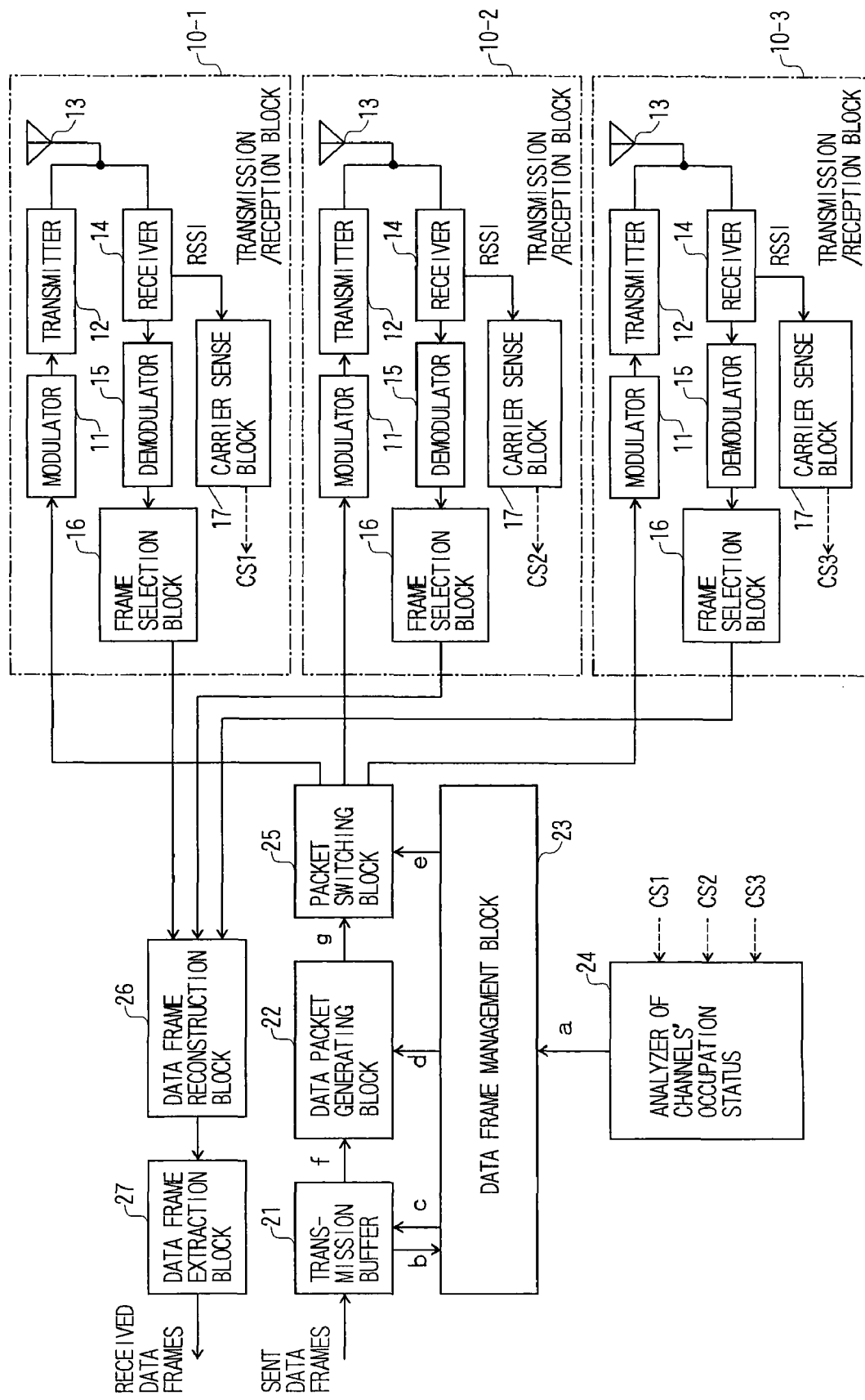
FIG. 22 is a block diagram showing the configuration of an exemplary wireless packet communication apparatus according to the invention.

FIG. 22 shows a wireless packet communication apparatus according to an embodiment of the invention. Although the following description will be directed to the configuration of a wireless packet communication apparatus capable of transmitting and receiving three data packets simultaneously using three radio channels #1, #2, and #3, the parallelism number may be set arbitrarily. Where MIMO is used for each radio channel, data packets can be transmitted and received simultaneously in the number of simultaneous transmissions that is equal to the sum of MIMO numbers of plural respective radio channels. However, the MIMO will not be taken into consideration in the following description.

As shown in the figure, the wireless packet communication apparatus is equipped with transmission/reception blocks 10-1, 10-2, and 10-3, a transmission buffer 21, a data packet generating block 22, a data frame management block 23, an analyzer of channels' occupation status 24, a packet switching block 25, a packet order management block 26, and a data frame extraction block 27.

The transmission/reception blocks 10-1, 10-2, and 10-3 perform radio communications on different radio channels #1, #2, and #3. These radio channels have different radio frequencies etc. and hence are independent of each other, and can perform radio communications simultaneously using plural radio channels. Each transmission/reception block 10 is equipped with a modulator 11, a transmitter 12, an antenna 13, a receiver 14, a demodulator 15, a frame selection block 16, and a carrier sense block 17.

Radio frequency signals that are transmitted from other wireless packet communication apparatus on the different radio channels #1, #2, and #3 are input to the receivers 14 via the antennas 13 of the transmission/reception blocks 10-1, 10-2, and 10-3, respectively. Each receiver 14 corresponding to the associated radio channel performs reception processing including frequency conversion, filtering, quadrature detection, and analog to digital conversion (AD conversion) on the input radio frequency signal. A radio frequency signal on the radio propagation path of the associated radio channel is always input to the receiver 14 except during periods when the antenna 13 connected to it is used for transmission. The receiver 14 outputs, to the carrier sense block 17, a received signal strength indication (hereinafter RSSI) signal indicating received electric field strength of the associated radio channel. When a radio frequency signal transmitted on the radio channel corresponding to the receiver 14 is received, the receiver 14 outputs a baseband signal produced by the reception processing to the demodulator 15.

The demodulator 15 performs demodulation processing on the baseband signal received from the receiver 14, and outputs a resulting data packet to the frame selection block 16. The frame selection block 16 performs a CRC check on the input data packet. If the data packet has been received correctly, the frame selection block 16 judges whether the data packet is directed to its own station. More specifically, the frame selection block 16 checks whether the destination ID of the data packet coincides with its own station. If the data packet is directed to its own station, the frame selection block 16 outputs the data packet to the packet order management block 26. At the same time, reply processing is performed in which an ACK packet generating block (not shown) generates a delivery acknowledgment packet and sends it to the modulator 11. In transmitting the ACK packet, a transmission mode may be set (e.g., setting of a transmission rate and setting of non-use of MIMO). On the other hand, if the data packet is not directed to its own station, the frame selection block 16 discards the packet.

The packet order management block 26 checks sequence numbers that are attached to received data packets and rearranges the received data packets in proper order, that is, in order of the sequence numbers. Resulting data packets are output to the data frame extraction block 27 as a reception data packet sequence. The data frame extraction block 27 eliminates packet headers from the individual data packets included in the reception data packet sequence, and outputs resulting data as a reception data frame sequence.

When receiving an RSSI signal, the carrier sense block 17 compares the value of received electric field strength represented by the RSSI signal with a preset threshold value. If a state that the value of received electric field strength is smaller than the threshold value continues for a prescribed period, the carrier sense block 17 judges that the assigned radio channel is idle. Otherwise, the carrier sense block 17 judges that the assigned radio channel is busy. The carrier sense blocks 17 corresponding to the respective radio channels output such judgment results as carrier sense results CS1-CS3. In each transmission/reception block 10, no RSSI signal is input to the carrier sense block 17 while the antenna 13 is in a transmission state. When the antenna 13 has already been rendered in a transmission state, another data packet cannot be transmitted simultaneously as the radio frequency signal by using the same antenna 13. Therefore, when receiving no RSSI signal, each carrier sense block 17 outputs a carrier sense result indicating that the assigned radio channel is busy.

Figure 21:
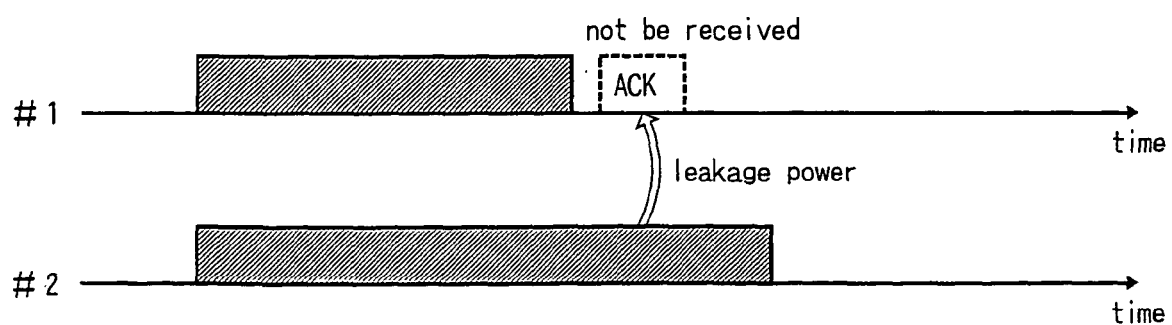
FIG. 21 is a time chart illustrating a problem of a case that the central frequencies of plural radio channels are close to each other.

Carrier sense results CS1-CS3 that are output from the carrier sense blocks 17 corresponding to the respective radio channels are input to the analyzer of channels' occupation status 24. The analyzer of channels' occupation status 24 manages the idle statuses of the respective radio channels on the basis of the carrier sense results corresponding to the respective radio channels, and communicates such information as idle radio channels and the number of idle radio channels to the data frame management block 23 (FIG. 21, a).

On the other hand, sent data frames to be transmitted are input to and buffered by the transmission buffer 21. The sent data frames consists of one or plural data frames. The transmission buffer 21 successively communicates, to the data frame management block 23, the number of data frames in its possession, ID information of destination wireless packet communication apparatus, data sizes, address information indicating positions in the buffer, and other information (b).

The data frame management block 23 determines how to generate data packets from what data frames and on what radio channels to transmit generated data packets according to one of the various control algorithms of the above-described first to 14th embodiments on the basis of data-frame-related information for each destination terminal ID that is communicated from the transmission buffer 21 and radio-channel-related information that is communicated from the analyzer of channels' occupation status 24, and informs the transmission buffer 21, the data packet generating block 22, and the data packet switching block 25 about determination results (c, d, e). For example, in the case of the first embodiment, if the number N of idle radio channels is smaller than the number K of transmission-standby data frames in the transmission buffer 21, the number of data packets to be transmitted simultaneously is set equal to the number N of idle radio channels and address information designating N data frames among the K data frames is communicated to the transmission buffer 21 (c). Information necessary for generating N data packets from data frames that are input from the transmission buffer 21 is communicated to the data packet generating block 22 (d). The packet switching block 25 is informed of correspondence between N data packets generated by the data packet generating block 22 and the idle radio channels (e). Similar processing is performed for each of the control algorithms of the other embodiments.

The transmission buffer 21 outputs the output-designated data frames to the data packet generating block 22 (f). The data packet generating block 22 extracts the data regions from the respective data frames, generates plural data blocks having the same packet time length, and generates each data packet by adding, to the data block therefor, a packet header including control information such as ID information of a destination terminal of the data packet and a sequence number indicating a place of the data frame in the sequence and a CRC code (FCS portion) as an error detecting code. The control information also includes information that is necessary for conversion into the original data frame when the receive-side station receives the data packet. The packet switching block 25 correlates the data packets received from the data packet generating block 22 with the respective radio channels.

As a result of the above correlation, the data packets that are allocated to the radio channels #1, #2, and #3 are input to the modulators 11 of the transmission/reception blocks 10-1, 10-2, and 10-3, respectively. When receiving the data packet from the packet switching block 25, each modulator 11 performs prescribed modulation processing on the data packet and outputs the thus-processed data packet to the associated transmitter 12. Each transmitter 12 performs transmission process including digital to analog conversion (DA conversion), frequency conversion, filtering, and power amplification on the modulation-processed data packet that is received from the associated modulator 11, and transmits the thus-processed data packet on the corresponding radio channel via the associated antenna 13.

The invention is not limited to the above embodiments and various modifications may be made without departing from the spirit and scope of the invention. Any improvement may be made in part or all of the components.

INDUSTRIAL APPLICABILITY

According to the present invention, plural data packets generated from one or plural data frames are transmitted simultaneously in parallel if plural radio channels are idle at the same time. Therefore, the maximum throughput is increased greatly and efficient wireless packet communication is realized.

Further, since the number of data frames to be transmitted simultaneously is determined properly on the basis of the number of detected idle channels and the number of transmission-standby data frames, the substantial throughput can be increased further.

Still further, even in transmitting plural data packets simultaneously using plural radio channels simultaneously, a problem that an ACK packet cannot be received due to influence of leakage power from a radio channel being used for a transmission can be avoided by equalizing the packet time lengths of the respective data packets. The throughput is thus increased.

The invention claimed is:

1. A wireless packet communication method transmitting a data packet between two stations ("STAs") that use plural radio channels, by using a radio channel that is judged idle by carrier sensing, characterized by:

when it is detected by said carrier sensing that plural radio channels are idle at the same time, transmitting plural data packets simultaneously from one STA to another STA using plural idle radio channels, characterized in that:

when a number K of transmission-standby data frames exceeds the number N of idle channels, said STA waits until a relationship $N \geq K$ is satisfied, all radio channels become idle before said relationship $N \geq K$ is satisfied, a prescribed time elapses before said relationship $N \geq K$ is satisfied, or the number or a data size of transmission-standby data frames reaches a prescribed value before said relationship $N \geq K$ is satisfied; and then generates and simultaneously transmits data packets in a number according to the number of idle radio channels.

2. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  transmitting plural data packets simultaneously from one STA to another STA using plural idle radio channels, characterized in that:
  when a number K of transmission-standby data frames is smaller than a number N of idle channels,
  said STA waits until a relationship N=K is satisfied, a prescribed time elapses before said relationship N=K is satisfied, or the number or a data size of transmission-standby data frames reaches a prescribed value before said relationship N=K is satisfied; and then
  generates and simultaneously transmits plural data packets.

3. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:
  when a number K of transmission-standby data frames exceeds a number of simultaneous transmissions T, the number of simultaneous transmissions T being said sum of said MIMO numbers of said plural respective radio channels,
  said STA waits until a relationship T≧K is satisfied, all radio channels become idle before said relationship T≧K is satisfied, a prescribed time elapses before said relationship T≧K is satisfied, or a number or a data size of transmission-standby data frames reaches a prescribed value before said relationship T≧K is satisfied; and then
  said STA generates and simultaneously transmits data packets in a number according to the number of simultaneous transmissions.

4. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:
  when a number K of transmission-standby data frames is smaller than a number of simultaneous transmissions T, the number of simultaneous transmissions T being said sum of said MIMO numbers of said plural respective radio channels,
  said STA waits until a relationship T=K is satisfied, a prescribed time elapses before said relationship T=K is satisfied, or a number or a data size of transmission-standby data frames reaches a prescribed value before said relationship T=K is satisfied; and then
  said STA generates and simultaneously transmits plural data packets.

5. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  generating plural data packets; and
  transmitting plural data packets simultaneously from one STA to another STA using plural idle radio channels, where each of the plural data packets require same amount of time for transmission from one STA to another STA, characterized in that:
  when a number K of transmission-standby data frames exceeds the number N of idle channels,
  said STA waits until a relationship N≧K is satisfied, all radio channels become idle before said relationship N≧K is satisfied, a prescribed time elapses before said relationship N≧K is satisfied, or the number or a data size of transmission-standby data frames reaches a prescribed value before said relationship N≧K is satisfied; and then
  generates and simultaneously transmits data packets in a number according to the number of idle radio channels.

6. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  generating plural data packets; and
  transmitting plural data packets simultaneously from one STA to another STA using plural idle radio channels, where each of the plural data packets require same amount of time for transmission from one STA to another STA, characterized in that:
  when a number K of transmission-standby data frames is smaller than a number N of idle channels,
  said STA waits until a relationship N=K is satisfied, a prescribed time elapses before said relationship N=K is satisfied, or the number or a data size of transmission-standby data frames reaches a prescribed value before said relationship N=K is satisfied; and then
  generates and simultaneously transmits plural data packets.

7. A wireless packet communication method transmitting a data packet between two stations ("STAs") that use plural radio channels, by using a radio channel that is judged idle by carrier sensing, characterized by:
  when it is detected by said carrier sensing that plural radio channels are idle at the same time,
  generating plural data packets; and
  transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames exceeds a number of simultaneous transmissions T, the number of simultaneous transmissions T being said sum of said MIMO numbers of said plural respective radio channels, said STA waits until a relationship T≧K is satisfied, all radio channels become idle before said relationship T≧K is satisfied, a prescribed time elapses before said relationship T≧K is satisfied, or a number or a data size of transmission-standby data frames reaches a prescribed value before said relationship T≧K is satisfied; and then said STA generates and simultaneously transmits data packets in a number according to the number of simultaneous transmissions.

8. A wireless packet communication method transmitting a data packet between two stations ("STAs") that use plural radio channels, by using a radio channel that is judged idle by carrier sensing, characterized by:

when it is detected by said carrier sensing that plural radio channels are idle at the same time, generating plural data packets; and transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames is smaller than a number of simultaneous transmissions T, the number of simultaneous transmissions T being said sum of said MIMO numbers of said plural respective radio channels, said STA waits until a relationship T=K is satisfied, a prescribed time elapses before said relationship T=K is satisfied, or a number or a data size of transmission-standby data frames reaches a prescribed value before said relationship T=K is satisfied; and then said STA generates and simultaneously transmits plural data packets.

9. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, generating plural data packets in accordance with transmission rates of plural idle radio channels; and transmitting plural data packets simultaneously from one STA to another STA using plural idle radio channels, where each of the plural data packets require same amount of time for transmission from one STA to another STA, characterized in that:

when a number K of transmission-standby data frames exceeds the number N of idle channels, said STA waits until a relationship N≧K is satisfied, all radio channels become idle before said relationship N≧K is satisfied, a prescribed time elapses before said relationship N≧K is satisfied, or the number or a data size of transmission-standby data frames reaches a prescribed value before said relationship N≧K is satisfied; and then generates and simultaneously transmits data packets in a number according to the number of idle radio channels.

10. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, generating plural data packets in accordance with transmission rates of plural idle radio channels; and transmitting plural data packets simultaneously from one STA to another STA using plural idle radio channels, where each of the plural data packets require same amount of time for transmission from one STA to another STA, characterized in that:

when a number K of transmission-standby data frames is smaller than a number N of idle channels, said STA waits until a relationship N=K is satisfied, a prescribed time elapses before said relationship N=K is satisfied, or the number or a data size of transmission-standby data frames reaches a prescribed value before said relationship N=K is satisfied; and then generates and simultaneously transmits plural data packets.

11. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, generating plural data packets in accordance with transmission rates of plural idle radio channels; and transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames exceeds a number of simultaneous transmissions T, the number of simultaneous transmissions T being said sum of said MIMO numbers of said plural respective radio channels, said STA waits until a relationship T≧K is satisfied, all radio channels become idle before said relationship T≧K is satisfied, a prescribed time elapses before said relationship T≧K is satisfied, or a number or a data size of transmission-standby data frames reaches a prescribed value before said relationship T≧K is satisfied; and then said STA generates and simultaneously transmits data packets in a number according to the number of simultaneous transmissions.

12. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, generating plural data packets in accordance with transmission rates of plural idle radio channels; and transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames is smaller than a number of simultaneous transmissions T, the number of simultaneous transmissions T being said sum of said MIMO numbers of said plural respective radio channels, said STA waits until a relationship T=K is satisfied, a prescribed time elapses before said relationship T=K is satisfied, or a number or a data size of transmission-standby data frames reaches a prescribed value before said relationship T=K is satisfied; and then said STA generates and simultaneously transmits plural data packets.

13. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, setting transmission rates of plural idle radio channels to a same transmission rate;

generating plural data packets; and transmitting plural data packets simultaneously from one STA to another STA using plural idle radio channels, where each of the plural data packets require same amount of time for transmission from one STA to another STA, characterized in that:

when a number K of transmission-standby data frames exceeds the number N of idle channels, said STA waits until a relationship N≧K is satisfied, all radio channels become idle before said relationship N≧K is satisfied, a prescribed time elapses before said relationship N≧K is satisfied, or the number or a data size of transmission-standby data frames reaches a prescribed value before said relationship N≧K is satisfied; and then generates and simultaneously transmits data packets in a number according to the number of idle radio channels.

14. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, setting transmission rates of plural idle radio channels to a same transmission rate;

generating plural data packets; and transmitting plural data packets simultaneously from one STA to another STA using plural idle radio channels, where each of the plural data packets require same amount of time for transmission from one STA to another STA, characterized in that:

when a number K of transmission-standby data frames is smaller than a number N of idle channels, said STA waits until a relationship N=K is satisfied, a prescribed time elapses before said relationship N=K is satisfied, or the number or a data size of transmission-standby data frames reaches a prescribed value before said relationship N=K is satisfied; and then generates and simultaneously transmits plural data packets.

15. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, setting transmission rates of plural idle radio channels to a same transmission rate;

generating plural data packets; and transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames exceeds a number of simultaneous transmissions T, the number of simultaneous transmissions T being said sum of said MIMO numbers of said plural respective radio channels, said STA waits until a relationship T≧K is satisfied, all radio channels become idle before said relationship T≧K is satisfied, a prescribed time elapses before said relationship T≧K is satisfied, or a number or a data size of transmission-standby data frames reaches a prescribed value before said relationship T≧K is satisfied; and then said STA generates and simultaneously transmits data packets in a number according to the number of simultaneous transmissions.

16. A wireless packet communication method transmitting a data packet between two stations ("STAs") that use plural radio channels and setting transmission rates for respective radio channels, by using a radio channel that is judged idle by carrier sensing, characterized by:

when it is detected by said carrier sensing that plural radio channels are idle at the same time, setting transmission rates of plural idle radio channels to a same transmission rate;

generating plural data packets; and transmitting plural data packets simultaneously from one STA to another STA using plural idle radio channels and Multiple Input Multiple Output ("MIMO"), where each of the plural data packets require same amount of time for transmission from one STA to another STA, the plural data packets being in a number that is equal to a sum of MIMO numbers of plural respective radio channels, and said STAs capable of using plural radio channels and MIMO together, characterized in that:

when a number K of transmission-standby data frames is smaller than a number of simultaneous transmissions T, the number of simultaneous transmissions T being said sum of said MIMO numbers of said plural respective radio channels, said STA waits until a relationship T=K is satisfied, a prescribed time elapses before said relationship T=K is satisfied, or a number or a data size of transmission-standby data frames reaches a prescribed value before said relationship T=K is satisfied; and then said STA generates and simultaneously transmits plural data packets.

* * * * *